(12) United States Patent
Ouedraogo et al.

(10) Patent No.: US 12,294,700 B2
(45) Date of Patent: May 6, 2025

(54) VIDEO CODING SUPPORTING SUBPICTURES, SLICES AND TILES

(71) Applicant: CANON KABUSHIKI KAISHA, Tokyo (JP)

(72) Inventors: Naël Ouedraogo, Val d'Anast (FR); Guillaume Laroche, Saint Aubin d'Aubigné (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 17/787,196

(22) PCT Filed: Dec. 17, 2020

(86) PCT No.: PCT/EP2020/086719
§ 371 (c)(1),
(2) Date: Jun. 17, 2022

(87) PCT Pub. No.: WO2021/122956
PCT Pub. Date: Jun. 24, 2021

(65) Prior Publication Data
US 2023/0060709 A1    Mar. 2, 2023

(30) Foreign Application Priority Data

Dec. 20, 2019  (GB) .................................... 1919024

(51) Int. Cl.
*H04N 19/119*  (2014.01)
*H04N 19/174*  (2014.01)
*H04N 19/70*   (2014.01)

(52) U.S. Cl.
CPC ......... *H04N 19/119* (2014.11); *H04N 19/174* (2014.11); *H04N 19/70* (2014.11)

(58) Field of Classification Search
CPC .... H04N 19/119; H04N 19/174; H04N 19/70; H04N 19/17; H04N 19/463; H04N 19/96
(Continued)

(56) References Cited

U.S. PATENT DOCUMENTS 11,297,350 B1*   4/2022  Choi ................... H04N 19/105
2013/0202051 A1*  8/2013  Zhou ................... H04N 19/521
                                                            375/240.26
(Continued)

FOREIGN PATENT DOCUMENTS

CN      110035331 A     7/2019
CN      110493604 A    11/2019
(Continued)

OTHER PUBLICATIONS

Li Jingya, et al., AHG12: Modification for subpicture, Joint Video Experts Team of ITU-T SG16 WP3 and ISO/IEC JTC1/SC29/WG11, 16th Meeting; Geneva, CH Oct. 1-11, 2019, Doc. No. JVET-P0171-v2, XP30216492.
(Continued)

*Primary Examiner* — Tung T Vo
(74) *Attorney, Agent, or Firm* — Canon U.S.A., Inc. IP Division

(57) ABSTRACT

A method of processing image data for one or more image-(s), each image consisting of one or more tile(s) and being divisible into one or more image portion(s), wherein the image is divisible into one or more subpicture-(s), and the method comprises: determining one or more image portion(s) included in a subpicture; and —processing the one or more image(s) using information obtained from the determination.

20 Claims, 14 Drawing Sheets

(58) Field of Classification Search
USPC .................................................... 375/240.2
See application file for complete search history.

(56) References Cited

U.S. PATENT DOCUMENTS

| | | | |
|---|---|---|---|
| 2019/0014337 A1* | 1/2019 | Skupin | H04N 19/119 |
| 2020/0344499 A1* | 10/2020 | Fang | H04N 21/816 |
| 2020/0404269 A1* | 12/2020 | Choi | H04N 19/80 |
| 2021/0092426 A1* | 3/2021 | Choi | H04N 19/70 |
| 2021/0337198 A1* | 10/2021 | Wang | H04N 19/137 |
| 2021/0337199 A1* | 10/2021 | Wang | H04N 19/1883 |
| 2021/0337200 A1* | 10/2021 | Wang | H04N 19/593 |
| 2021/0409785 A1* | 12/2021 | Wang | H04N 19/119 |
| 2022/0217407 A1* | 7/2022 | Bang | H04N 19/167 |
| 2022/0224932 A1* | 7/2022 | Lim | H04N 19/176 |
| 2022/0272330 A1* | 8/2022 | Zhang | H04N 19/52 |
| 2022/0368899 A1* | 11/2022 | Kim | H04N 19/174 |
| 2023/0319299 A1* | 10/2023 | Wang | H04N 19/174 |

FOREIGN PATENT DOCUMENTS

| | | |
|---|---|---|
| JP | 2022518170 A | 3/2022 |
| WO | 2019016287 A1 | 1/2019 |
| WO | 2019139014 A1 | 7/2019 |
| WO | 2019195035 A1 | 10/2019 |
| WO | 2020/146662 A1 | 7/2020 |

OTHER PUBLICATIONS

Benjamin Bross, et al., Versatile Video Coding (Draft 6), Joint Video Experts Team of ITU-T SG16 WP3 and ISO/IEC JTCI/SC29/WG11, 15th Meeting; Gothenburg, SE, Jul. 3-12, 2019, Doc. No. JVET-O2001-vE, XP30208568.

Lulin Chen, et al., AHG17/AHG12: On associating slices with a subpicture, Joint Video Experts Team of ITU-T SG16 WP3 and ISO/IEC JTCI/SC29/WG11, 16th Meeting; Geneva, CH Oct. 1-11, 2019, Doc. No. JVET-P0144-v1, XP30216348.

Naël Ouedraogo, et al., AHG12: On "tile-fraction" slices and signaling of slices per subpicture, Joint Video Experts Team of ITU-T SG16 WP3 and ISO/IEC JTCI/SC29/WG11, 17th Meeting, Brussels, BE, Jan. 7-17, 2020, Doc. No. JVET-Q0377.

Ye-Kui Wang, et al, AHG12: Sub-picture-based coding for VVC, Joint Video Experts Team of ITU-T SG16 WP3 and ISO/IEC JTCI/SC29/WG11, 14th Meeting; Geneva, CH, Mar. 19-27, 2019, Doc. No. JVET-N0107-v1.

Guo Chunfui, Real-time H.264 Hd Video Encoding System Based on Multi-DSP, Shanghai, China, 2010.

Benjamin Bross, et Al., Versatile Video Coding (Draft 7), Joint Video Experts of ITU-T SG 16 WP3 and ISO/IEC JTC 1/SC 29/WG 11, 16th Meeting; Geneva, CH Oct. 1-11, 2019, Doc. No. JVET-P2001-vE.

* cited by examiner

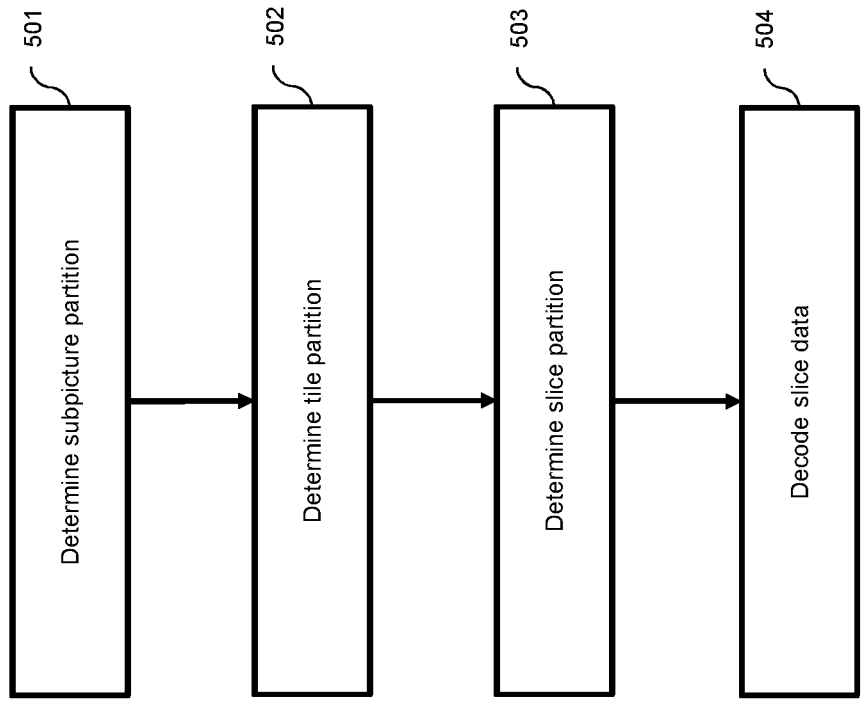

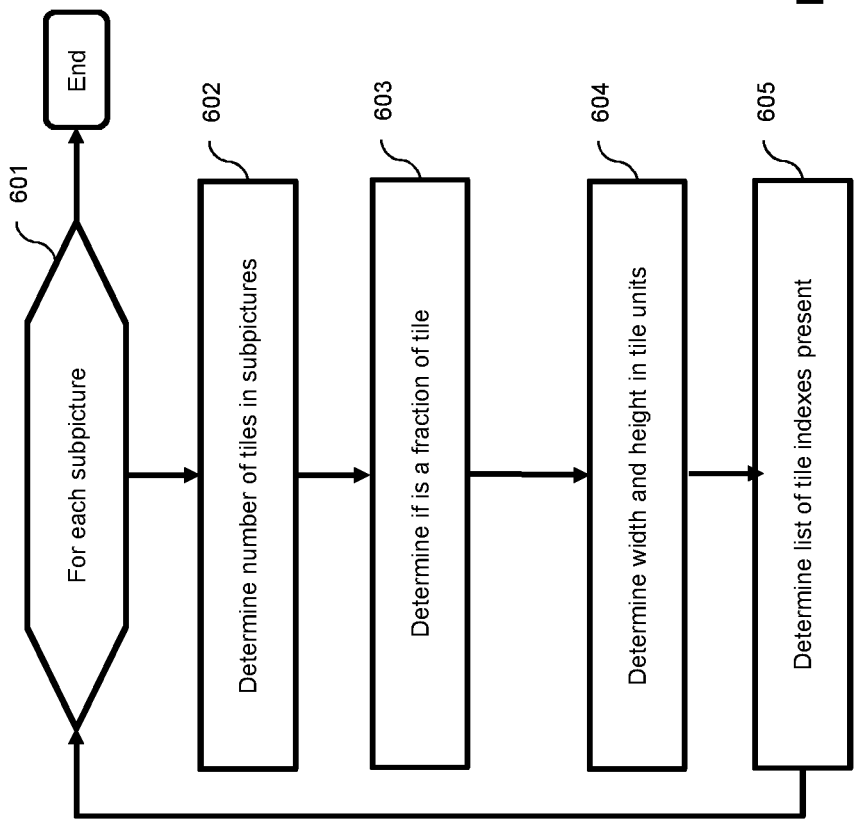

VIDEO CODING SUPPORTING SUBPICTURES, SLICES AND TILES

CROSS REFERENCE TO RELATED APPLICATION

This application is the National Phase application of PCT Application No. PCT/EP2020/086719, filed on Dec. 17, 2020. This application claims the benefit under 35 U.S.C. § 119 (a)-(d) of United Kingdom Patent Application No. 1919024.8, filed on Dec. 20, 2019. The above cited patent applications are incorporated herein by reference in their entirety.

FIELD OF INVENTION

The present invention relates to partitioning of an image, and encoding or decoding of the image or a sequence of images comprising the image. Embodiments of the invention find particular, but not exclusive, use when encoding or decoding a sequence of images using a first partitioning of the image into one or more subpicture(s) and a second partitioning of the image into one or more slice(s).

BACKGROUND

A video coding includes image coding (an image is equivalent to a single frame of a video or a picture). In video coding, before some coding tools such as motion compensation/prediction (e.g. inter-prediction) or intra-prediction can be used on an image, the image is first partitioned (e.g. divided) into one or more image portions so that the coding tool can be applied using on an image portion. The present invention relates particularly to partitioning of an image into two types of image portions, subpicture(s) and slice(s), which have been studied by the Video Coding Experts Group/Moving Picture Experts Group (VCEG/MPEG) standardisation groups, and is being considered for use in the Versatile Video Coding (VVC) standard.

A subpicture is a new concept introduced in VVC to enable bitstream extraction and merging operations of independent spatial regions (or image portions) from different bitstreams. By "independent", here we mean those regions (or image portions) are coded/decoded without referring to information obtained from encoding/decoding another region or image portion. For example, independent spatial regions (i.e. regions or image portions which are coded/decoded without referring to encoding/decoding of another region/image portion from the same image) are used for a region of interest (ROI) streaming (e.g. during a 3D video streaming) or for a streaming of omnidirectional video content (e.g. a sequence of images being streamed using the Omnidirectional MediA Format (OMAF) standard), in particular when the viewport dependent streaming approach is used for the streaming. Each image from the omnidirectional video content is divided into independent regions encoded in different versions thereof (e.g. in terms of image quality or resolution). A client terminal (e.g. a device with a display such as a mobile phone) is then able to select an appropriate version of the independent regions to obtain a high quality version of the independent regions in the main viewing direction while still being able to use lower quality version of the remaining regions for the remaining parts of the omnidirectional video content to improve coding efficiency.

High Efficiency Video Coding (HEVC or H.265) provides a motion constrained tile set signalling (e.g. a bitstream comprises data for specifying or determining a tile set which has its motion prediction restricted to make it "independent" from another region of the image) to indicate independently coded region. In HEVC, this signalling is made in a Supplemental Enhancement Information (SEI) message and is only optional. However, in HEVC a slice signalling is made independent of this SEI message so that partitioning of an image into one or more slice(s) is defined independent of partitioning of the same image into one or more tile set(s). This means the slice partitioning does not have the same motion prediction restriction imposed on it.

A proposal based on an old draft of the Versatile Video Coding Draft 4 (VVC4) included a signalling a tile group partitioning that depends on a subpicture signalling. A tile group is an integer number of complete tiles of a picture that are exclusively contained in a single Network Abstraction Layer (NAL) unit. This proposal (JVET-N0107: AHG12: Sub-picture-based coding for VVC, Huawei) was a syntax change proposal for introducing subpicture concept for VVC. A subpicture position is signalled using luma sample positions in a Sequence Parameter Set (SPS). Then a flag in the SPS indicates for each subpicture if motion prediction is constrained but the tile group partitioning (i.e. partitioning of a picture into one or more tile group(s)) is signalled in a Picture Parameter Set (PPS), wherein each PPS is defined per subpicture. As the PPS is provided per subpicture, the tile group partitioning is signalled per subpicture in JVET-N0107.

However, the latest Versatile Video Coding Draft 7 (VVC7) no longer has this tile group partitioning concept. VVC7 signals a subpicture layout in CTU units in the SPS. Flags in the SPS indicate whether the motion prediction is constrained for the subpicture. The SPS syntax elements for these are the following:

| | Descriptor |
|---|---|
| seq_parameter_set_rbsp( ) { | |
|   sps_decoding_parameter_set_id | u(4) |
|   [...] | |
|   sps_seq_parameter_set_id | u(4) |
|   [...] | |
|   subpics_present_flag | u(1) |
|   if( subpics_present_flag ) { | |
|     sps_num_subpics_minus1 | u(8) |
|     for( i = 0; i <= sps_num_subpics_minus1; i++ ) { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|     } | |
|   } | |
|   sps_subpic_id_present_flag | u(1) |
|   if( sps_subpic_id_present_flag ) { | |
|     sps_subpic_id_signalling_present_flag | u(1) |
|     if( sps_subpic_id_signalling_present_flag ) { | |
|       sps_subpic_id_len_minus1 | ue(v) |
|       for( i = 0; i <= sps_num_subpics_minus1; i++ ) | |
|         sps_subpic_id[ i ] | u(v) |
|     } | |
|   } | |
|   [...] | |

In the VVC7, a slice partitioning is defined in the PPS based on a tile partition as follows:

|  | Descriptor |
|---|---|
| pic_parameter_set_rbsp( ) { |  |
|   pps_pic_parameter_set_id | ue(v) |
|   [...] |  |
|   pps_subpic_id_signalling_present_flag | u(1) |
|   if( pps_subpic_id_signalling_present_flag ) { |  |
|     pps_num_subpics_minus1 | ue(v) |
|     pps_subpic_id_len_minus1 | ue(v) |
|     for( i = 0; i <= pps_num_subpic_minus1; i++ ) |  |
|       pps_subpic_id[ i ] | u(v) |
|   } |  |
|   no_pic_partition_flag | u(1) |
|   if( !no_pic_partition_flag ) { |  |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) |  |
|       tile_column_width_minus1[ i ] | ue(v) |
|     for( i = 0; i <= num_exp_tile_rows_minus1; i++ ) |  |
|       tile_row_height_minus1[ i ] | ue(v) |
|     rect_slice_flag | u(1) |
|     if( rect_slice_flag ) |  |
|       single_slice_per_subpic_flag | u(1) |
|     if( rect_slice_flag && |  |
|     !single_slice_per_subpic_flag ) { |  |
|       num_slices_in_pic_minus1 | ue(v) |
|       tile_idx_delta_present_flag | u(1) |
|       for( i = 0; i < num_slices_in_pic_minus1; i++ ) { |  |
|         slice_width_in_tiles_minus1[ i ] | ue(v) |
|         slice_height_in_tiles_minus1[ i ] | ue(v) |
|         if(_slice_width_in_tiles_minus1[ i ] = = 0 && |  |
|           slice_height_in_tiles_minus1[ i ] = = 0 ) { |  |
|           num_slices_in_tile_minus1[ i ] | ue(v) |
|           for( j = 0; j < num_slices_in_tile_minus1[ i ]; j++ ) |  |
|             slice_height_in_ctu_minus1[ i++ ] | ue(v) |
|         } |  |
|         if( tile_idx_delta_present_flag && i < num_slices_in_pic_minus1 ) |  |
|           tile_idx_delta[ i ] | se(v) |
|       } |  |
|     } |  |
|     loop_filter_across_tiles_enabled_flag | u(1) |
|     loop_filter_across_slices_enabled_flag | u(1) |
|   } |  |

This means the slice partitioning is defined independent of the subpicture partitioning in VVC7. VVC7 syntax for the slice partitioning is made on top of a tile structure without reference to a subpicture because this independence of the subpicture avoids any specific processing for the subpicture during encoding/decoding process, resulting in a simpler processing for the subpicture.

SUMMARY OF THE INVENTION

As mentioned above, the VVC7 provides several tools to partition a Picture into regions of pixels (or component samples). Some examples of these tools are the subpictures, the slices and the tiles. In order to accommodate all these tools whilst maintaining their functionality, the VVC7 imposes some constraints on the partitioning of the picture into these regions. For instance, a tile must have a rectangular shape and the tiles must form a grid. A slice can be either an integer number of tiles or a fraction of a tile (i.e. a slice includes only a part of a tile or a "partial tile" or a "fraction tile"). A subpicture is a rectangular region that must contain one or more slice(s). However, in VVC7 the signalling of subpicture partitioning is independent of the slice and the tile grid signalling. So this signalling in VVC7 requires a decoder to check, and ensure, that the picture partitioning conforms to VVC7's constraints, which can be complex and lead to unnecessary time or resource consumption at the decoder end.

It is an aim of embodiments of the present invention to address one or more problems or disadvantages of the foregoing partitioning of an image, and encoding or decoding of the image or a sequence of images comprising said image. For example, one or more embodiments of the invention aim to improve, and optimize, the signalling of a picture partitioning (e.g. within the VVC7 context) whilst ensuring at least some of the constraints that require checking in VVC7 are fulfilled/satisfied by design during the signalling or encoding process.

According to aspects of the present invention there are provided an apparatus/device, a method, a program, a computer readable storage medium, and a carrier medium/signal as set forth in the appended claims. Other features of the invention will be apparent from the dependent claims, and the description. According to other aspects of the invention, there are provided a system, a method for controlling such a system, an apparatus/device for performing the method as set forth in the appended claims, an apparatus/device for processing, a media storage device storing a signal as set forth in the appended claim, a computer readable storage medium or a non-transitory computer-readable storage medium storing the program as set forth in the appended claims, and a bitstream generated using an encoding method as set forth in the appended claims. Other features of the invention will be apparent from the dependent claims, and the description which follows.

According to a first aspect of the present invention, there is provided a method of processing image data for one or more image(s), each image consisting of one or more tile(s) and being divisible into one or more image portion(s), wherein the image is divisible into one or more subpicture(s), and the method comprises: determining one or more image portion(s) included in a subpicture; and processing the one or more image(s) using information obtained from the determination.

According to a second aspect of the present invention, there is provided a method of partitioning one or more image(s), the method comprising: partitioning an image into one or more tile(s); partitioning said image into one or more subpicture(s); and partitioning said image into one or more image portion(s) by processing image data for the image according to the first aspect.

According to a third aspect of the present invention, there is provided a method of signalling partitioning of one or more image(s), the method comprising: processing image data for the one or more image(s) according to the first aspect; and signalling information for determining the partitioning in a bitstream.

For the aforementioned aspects of the present invention, following features may be provided according to an embodiment thereof. Suitably, an image portion is capable of including a partial tile. Suitably, an image portion is coded in, or decoded from, (e.g. signalled in, communicated in, provided in, or obtained from) a single logical unit (e.g. in one Network Abstraction Layer unit or one NAL unit). Suitably, a tile and/or a subpicture is not coded in, or decoded from, (e.g. signalled in, communicated in, provided in, or obtained from) a single logical unit (e.g. one NAL unit).

According to a fourth aspect of the present invention, there is provided a method of processing image data for one or more image(s), each image consisting of one or more tile(s) and being divisible into one or more image portion(s), wherein an image portion is capable of including a part of a tile (partial tile), and the image is divisible into one or more subpicture(s), and the method comprises: determining one or more image portion(s) included in a subpicture; and processing the one or more image(s) using information obtained from the determination. The part of a tile (partial tile) may be an integer number of consecutive complete coding tree unit (CTU) rows within a tile.

For the aforementioned aspects of the present invention, following features may be provided according to an embodiment thereof. Suitably, the determining comprises defining the one or more image portion(s) using one or more of: an identifier for the subpicture; a size, a width or a height of the subpicture; whether only a single image portion is included in the subpicture; and a number of image portion(s) included in the subpicture.

Suitably, when the number of image portion(s) included in the subpicture is greater than one, each image portion is determined based on a number of tile(s) included therein.

Suitably, when an image portion comprises one or more parts of a tile (partial tile(s)), said image portion is determined based on a number of row(s) or column(s) of Coding Tree Unit(s) CTU(s) to be included therein.

Suitably, the processing comprises: providing in, or obtaining from, a Picture Parameter Set PPS, information for determining an image portion based on a number of tile(s); and when an image portion comprises one or more parts of a tile (partial tile(s)), providing in, or obtaining from, a header of one or more logical unit(s) which include encoded data of said image portion, information for identifying said image portion comprising the one or more parts of a tile (partial tile(s)).

Suitably, the image portion consists of a sequence of tile(s) in a tile raster scan order.

Suitably, the processing comprises providing in, or obtaining from, a bitstream, information for determining one or more of: whether only a single image portion is included in the subpicture; a number of image portion(s) included in the subpicture. Suitably, the processing comprises providing in, or obtaining from, a bitstream, whether use of an image portion comprising a part of tile (partial tile) is allowed when processing one or more image(s).

Suitably, the information provided in, or obtained from, the bitstream comprises: information indicating whether a subpicture is used in a video sequence or not; and one or more image portion(s) of a video sequence is/are determined as not being allowed to comprise a part of a tile (partial tile) when the information indicates a subpicture is not used in the video sequence.

Suitably, the information for determining is provided in, or obtained from, a Picture Parameter Set PPS.

Suitably, the information for determining is provided in, or obtained from, a Sequence Parameter Set SPS.

Suitably, when the information for determining indicates the number of image portion(s) included in the subpicture is one, the subpicture consists of a single image portion which does not comprise a part of a tile (partial tile).

Suitably, the subpicture comprises two or more image portions, each image portion comprising one or more parts of a tile (partial tile(s)).

Suitably, the one or more parts of a tile (partial tile(s)) are from the same single tile.

Suitably, the two or more image portions are capable of comprising one or more parts of a tile (partial tile(s)) from more than one tile.

Suitably, an image portion consists of a number of tile(s), said image portion forming a rectangular region in the image.

Suitably, an image portion is a slice (the one or more image portion(s) is/are one or more slice(s)).

According to a fifth aspect of the present invention, there is provided a method of encoding one or more image(s), the method comprising any of: processing image data according to the first aspect or the fourth aspect; partitioning according to the second aspect; or/and signalling according to the third aspect.

Suitably, the method further comprises: receiving an image; processing image data for the received image according to the first aspect or the fourth aspect; and encoding the received image and generating a bitstream.

Suitably, the method further comprises providing, in a bitstream, one or more of: information for determining an image portion based on a number of tile(s) in a Picture Parameter Set PPS, and, when an image portion comprises one or more parts of a tile (partial tile(s)), information for identifying said image portion comprising the one or more parts of a tile (partial tile(s)) in a header of one or more logical unit(s) which include encoded data of said image portion, a slice segment header or a slice header; in the PPS, information for determining whether only a single image portion is included in the subpicture; in the PPS, information for determining a number of image portion(s) included in the subpicture; in a Sequence Parameter Set SPS, information for determining whether use of an image portion comprising a part of a tile (partial tile) is allowed when processing one or more image(s); and in the SPS, information indicating whether a subpicture is used in a video sequence or not.

According to a sixth aspect of the present invention, there is provided a method of decoding one or more image(s), the method comprising any of: processing image data according to the first aspect or the fourth aspect; partitioning according to the second aspect; or/and signalling according to the third aspect.

Suitably, the method further comprises: receiving a bitstream; decoding information from the received bitstream and processing image data according to any of the first aspect or the fourth aspect; and obtaining an image using the decoded information and the processed image data.

Suitably, the method further comprises obtaining, from a bitstream, one or more of: information for determining an image portion based on a number of tile(s) from a Picture Parameter Set PPS, and, when an image portion comprises one or more parts of a tile (partial tile(s)), information for identifying said image portion comprising the one or more parts of a tile (partial tile(s)) from a header of one or more logical unit(s) which include encoded data of said image portion, a slice segment header or a slice header; from the PPS, information for determining whether only a single image portion is included in the subpicture; from the PPS, information for determining a number of image portion(s) included in the subpicture; from a Sequence Parameter Set SPS, information for determining whether use of an image portion comprising a part of a tile (partial tile) is allowed when processing one or more image(s); and from the SPS, information indicating whether a subpicture is used in a video sequence or not.

According to a seventh aspect of the present invention, there is provided a device for processing image data for one or more image(s), the device configured to perform the method according to any of the first aspect, the fourth aspect, the second aspect or the third aspect.

According to an eighth aspect of the present invention, there is provided a device for encoding one or more image(s), the device comprising the processing device according to the seventh aspect. Suitably, the device is configured to perform the method according to the fifth aspect.

According to a ninth aspect of the present invention, there is provided a device for decoding one or more image(s), the device comprising the processing device according to the seventh aspect. Suitably, the device is configured to perform the method according to the sixth aspect.

According to a tenth aspect of the present invention, there is provided a program which, when run on a computer or processor, causes the computer or processor to carry out the method according to the first aspect, the fourth aspect, the second aspect or the third aspect, the fifth aspect or the sixth aspect.

According to an eleventh aspect of the present invention, there is provided a carrier medium or a computer-readable storage medium carrying/storing the program of the tenth aspect.

According to a twelfth aspect of the present invention, there is provided a signal carrying an information dataset for an image encoded using the method according to the fifth aspect and represented by a bitstream, the image consisting of one or more tile(s) and being divisible into one or more image portion(s), wherein an image portion is capable of including a part of a tile (partial tile), and the image is divisible into one or more subpicture(s), wherein the information dataset comprises data for determining one or more image portion(s) included in a subpicture.

Yet further aspects of the present invention relate to programs which when executed by a computer or processor cause the computer or processor to carry out any of the methods of the aforementioned aspects. The program may be provided on its own or may be carried on, by or in a carrier medium. The carrier medium may be non-transitory, for example a storage medium, in particular a computer-readable storage medium. The carrier medium may also be transitory, for example a signal or other transmission medium. The signal may be transmitted via any suitable network, including the Internet.

Yet further aspects of the present invention relate to a camera comprising a device according to any of the aforementioned device aspects. According to yet another aspect of the present invention there is provided a mobile device comprising a device according to any of the aforementioned device aspects and/or a camera embodying the camera aspect above.

Any feature in one aspect of the invention may be applied to other aspects of the invention, in any appropriate combination. In particular, method aspects may be applied to apparatus aspects, and vice versa. Furthermore, features implemented in hardware may be implemented in software, and vice versa. Any reference to software and hardware features herein should be construed accordingly. Any apparatus feature as described herein may also be provided as a method feature, and vice versa. As used herein, means plus function features may be expressed alternatively in terms of their corresponding structure, such as a suitably programmed processor and associated memory. It should also be appreciated that particular combinations of the various features described and defined in any aspects of the invention can be implemented and/or supplied and/or used independently.

Further features, aspects, and advantages of the present invention will become apparent from the following description of embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

BRIEF DESCRIPTION OF THE DRAWINGS

Embodiments of the invention will now be described, by way of example only, and with reference to the following drawings in which:

FIG. 5 is a flow chart illustrating a decoding process according to an embodiment of the invention;

FIG. 6 is a flow chart illustrating determination steps used in signalling of a slice partitioning according to an embodiment of the invention;

DETAILED DESCRIPTION

Figure 1:
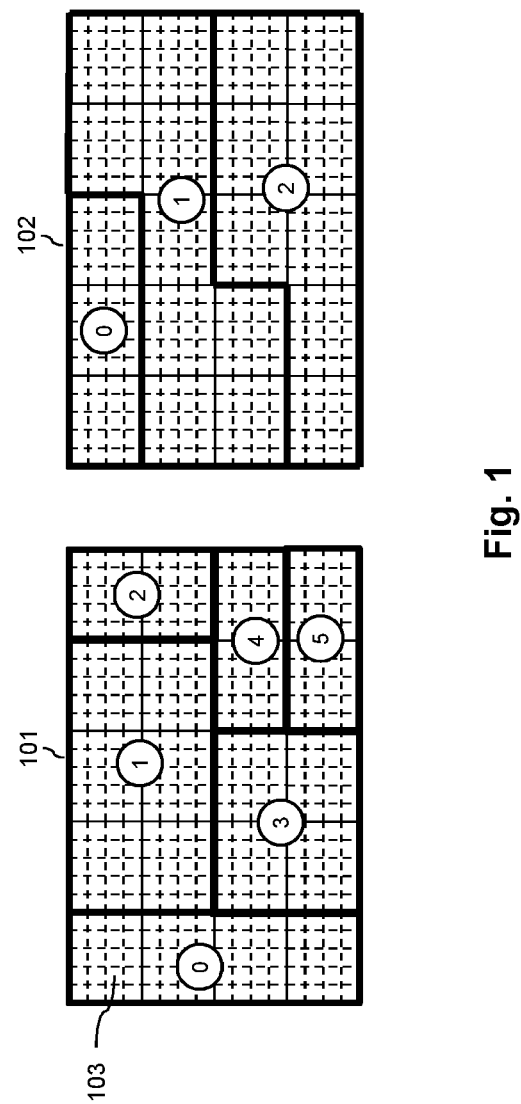
FIG. 1 illustrates partitioning of a Picture into tiles and slices according to an embodiment of the invention.

Embodiments of the present invention described below relate to improving encoding and decoding of images (or pictures).

In this specification "signalling" may refer to inserting into (providing/including/encoding in), or extracting/obtaining (decoding) from, a bitstream information about one or more parameters or syntax elements, for example information for determining any one or more of an identifier of a subpicture, a size/width/height of a subpicture, whether only a single image portion (e.g. a slice) is included in a subpicture, whether a slice is a rectangular slice, and/or a number of slices included in a subpicture. In this specification "processing" may refer to any kind of operation being performed on data, e.g. encoding or decoding image data for one or more image(s)/picture(s).

In this specification, the term "slice" is used as example of an image portion (other examples of such an image portion would be an image part which comprises one or more Coding Tree Unit(s)). It is understood that embodiments of the invention may also be implemented based on an image portion, instead of a slice, and an appropriately modified parameter/value/syntax such as a header for the image portion (instead of a slice header or a slice segment header). It is also understood that various information described herein as being signalled in a slice header, a slice segment header, a sequence parameter set (SPS), or a Picture Parameter Set (PPS) may be signalled elsewhere as long as they are capable of providing the same functionality provided by signalling them in those media. It is also understood that any of a slice, a tile group, a tile, a Coding Tree Unit (CTU)/Largest Coding Unit (LCU), a Coding Tree Block (CTB), a Coding Unit (CU), a Prediction Unit (PU), a Transform Unit (TU), or a block of pixels/samples may be referred to as an image portion.

It is also understood that: when a component or a tool is described as "active", the component/tool is "enabled" or "available for use" or "used"; when described as "inactive", the component/tool is "disabled" or "unavailable for use" or "not used"; and "can be inferred" refers to being able to determine/obtain a relevant value or a parameter from other information without explicitly signalling it in the bitstream. Further, it is also understood that when a flag is described as "active" it means the flag indicates the relevant component/tool is "active" (i.e "effective").

In this specification, following terms are used for the same, or functionally equivalent, definition as they are defined in VVC7 unless stated otherwise. Definitions used in VVC7 are set out below.

- A slice: An integer number of complete tiles or an integer number of consecutive complete CTU rows within a tile of a picture that are exclusively contained in a single NAL unit.
- A slice header: A part of a coded slice containing the data elements pertaining to all tiles or CTU rows within a tile represented in the slice.
- A tile: A rectangular region of CTUs within a particular tile column and a particular tile row in a picture.
- A subpicture: A rectangular region of one or more slices within a picture
- A picture (or an image): An array of luma samples in monochrome format or an array of luma samples and two corresponding arrays of chroma samples in 4:2:0, 4:2:2, and 4:4:4 colour format.
- A coded picture: A coded representation of a picture comprising VCL NAL units with a particular value of nuh_layer_id within an AU and containing all CTUs of the picture.
- A coded representation: A data element as represented in its coded form.
- A raster scan: A mapping of a rectangular two-dimensional pattern to a one-dimensional pattern such that the first entries in the one-dimensional pattern are from the first top row of the two-dimensional pattern scanned from left to right, followed similarly by the second, third, etc., rows of the pattern (going down) each scanned from left to right.
- A block: An M×N (M-column by N-row) array of samples, or an M×N array of transform coefficients.
- A coding block: An M×N block of samples for some values of M and N such that the division of a CTB into coding blocks is a partitioning.
- A coding tree block (CTB): An N×N block of samples for some value of N such that the division of a component into CTBs is a partitioning.
- A coding tree unit (CTU): A CTB of luma samples, two corresponding CTBs of chroma samples of a picture that has three sample arrays, or a CTB of samples of a monochrome picture or a picture that is coded using three separate colour planes and syntax structures used to code the samples.
- A coding unit (CU): A coding block of luma samples, two corresponding coding blocks of chroma samples of a picture that has three sample arrays, or a coding block of samples of a monochrome picture or a picture that is coded using three separate colour planes and syntax structures used to code the samples.
- A component: An array or single sample from one of the three arrays (luma and two chroma) that compose a picture in 4:2:0, 4:2:2, or 4:4:4 colour format or the array or a single sample of the array that compose a picture in monochrome format.
- A picture parameter set (PPS): A syntax structure containing syntax elements that apply to zero or more entire coded pictures as determined by a syntax element found in each slice header.
- A sequence parameter set (SPS): A syntax structure containing syntax elements that apply to zero or more entire CVSs as determined by the content of a syntax element found in the PPS referred to by a syntax element found in each slice header.

In this specification, following terms are also used for the same, or functionally equivalent, definition as they are defined below unless stated otherwise.

- A tile group: An integer number of complete (i.e. whole) tiles of a picture that are exclusively contained in a single NAL unit.
- A "tile fraction", a "partial tile", a "part of a tile", or a "fraction of a tile": an integer number of consecutive complete CTU rows within a tile of a picture which do not form a complete (i.e. whole) tile.
- A slice segment: An integer number of complete tiles or an integer number of consecutive complete CTU rows within a tile of a picture that are exclusively contained in a single NAL unit.
- A slice segment header: A part of a coded slice segment containing the data elements pertaining to all tiles or CTU rows within a tile represented in the slice segment.
- A slice when a slice segment is present: A set of one or more slice segment which collectively represent a tile of a picture or an integer number of complete tiles

EMBODIMENTS OF THE INVENTION

Partitioning of a Picture/Image and a Bitstream 3.1 Partitioning of a Picture into Tiles and Slices The compression of a video relies on a block-based video coding in most coding systems like HEVC or the emerging VVC standard. In these coding systems, a video is composed of a sequence of frames or pictures or images or samples which may be displayed at different points in time (e.g. at different temporal position within the video). In the case of a multilayered video (for example, a scalable, a stereo or a 3D video), several pictures may need be decoded to able to form the final/resulting image to be displayed at a particular point in time. A picture can also be composed of (i.e. image data for the picture comprises) more than one image components. An example of such an image component would be a component for encoding the luminance, the chrominance or depth information.

The compression of a video sequence uses on several different partitioning techniques for each picture (i.e. different schemes/frameworks/arrangements/mechanisms for partitioning/diving a picture) and how these partitioning techniques are implemented during the compression process.

FIG. 1 illustrates partitioning of a Picture into tiles and slices according to an embodiment of the invention, which is compatible with VVC7. The pictures 101 and 102 are divided into coding tree units (CTU) represented by the dotted lines. A CTU is an elementary unit of encoding and decoding for VVC7. For example, in VVC7, the CTU can encode an area of 128 by 128 pixels.

A Coding Tree Unit (CTU) may also be referred to as a block (of pixels or component sample (value)s), a macro block, or even a coding block. It can be used to encode/decode different image components of the picture simultaneously or it can be limited to only one image component so that the different image components of the picture can be encoded/decoded separately/individually. When data for an image comprise separate data for each component, a CTU groups a plurality of Coding Tree Blocks (CTBs), one CTB for each component.

As illustrated by FIG. 1, the picture can also be partitioned according to a grid of tiles (i.e. into one or more grid(s) of tiles), represented by the thin solid lines. The tiles are picture parts (parts/portions of the picture) which are rectangular regions (of pixels/component samples) that can be defined independent of the CTU partitioning. A tile may also correspond to a sequence of CTUs, e.g. in VVC7, so as in the represented example in FIG. 1, the partitioning technique can restrict the boundaries of tiles to coincide with/align with boundaries of CTUs.

The tiles are defined so that a tile boundary breaks spatial dependencies of the encoding/decoding process (i.e. in a given picture, a tile is defined/specified so that it can be encoded/decoded independent of another spatially "neighbouring" tile of the same picture). This means that encoding/decoding of a CTU in a tile is not based on pixel/sample or reference data from another tile in the same picture.

Some encoding/decoding systems, e.g. an embodiment of the invention or those for VVC7, provide a notion of a slice (i.e. also use a partitioning technique based on one or more slice(s)). This mechanism enables partitioning of the picture into one or several group(s) of tiles, a group of tile(s) being collectively referred to as a slice. Each slice is composed of one or several tile(s) or partial tile(s). Two different kinds of slices are provided as illustrated by pictures 101 and 102. A first kind of slice is restricted to slices forming a rectangular area/region in the picture as represented in thick solid lines in picture 101. Picture 101 illustrates a partitioning of the picture into six different rectangular slices (0)-(5). A second kind of slices is restricted to successive tiles (so that they form a sequence of tiles) in a raster scan order as represented in thick solid lines in picture 102. Picture 102 illustrates a partitioning of the picture into three different slices (0)-(2) composed of successive tiles in a raster scan order. Often, a rectangular slice is a structure/arrangement/configuration of choice for dealing with regions of interest (RoIs) in a video. A slice can be encoded in (or decoded from) the bitstream as one or several Network Abstraction Layer (NAL) units. A NAL unit is a logical unit of data for the encapsulation of data in the encoded/decoded bitstream (e.g. a packet that contains an integer number of bytes, wherein a plurality of packets collectively form a coded video data). In the encoding/decoding system for VVC7, a slice is normally coded as a single NAL unit. When a slice is coded in the bitstream as several NAL units, each NAL unit for the slice is referred to as a slice segment. A slice segment includes a slice segment header that contains the coding parameters for that slice segment. According to a variant, the header of the first slice segment NAL unit of the slice contains all the coding parameters for the slice. The slice segment header of the subsequent NAL unit(s) of the slice may contain fewer parameters than the first NAL unit. In such a case, the first slice segment is an independent slice segment and the subsequent segments are dependent slice segments (as they rely on coding parameters from the NAL unit of the first slice segment).

3.2 Partitioning into Subpictures

Figure 2:
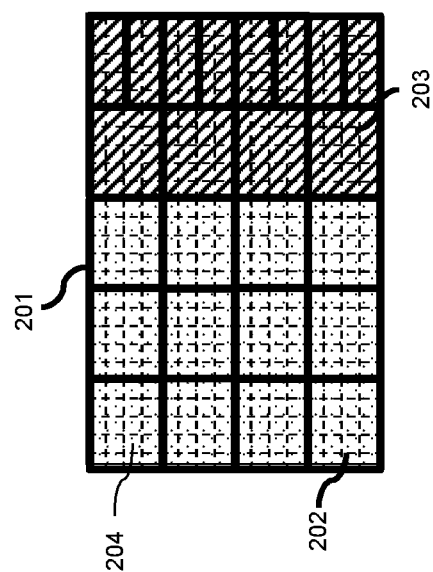
FIG. 2 illustrates a subpicture partitioning of a picture according to an embodiment of the invention.

FIG. 2 illustrates a subpicture partitioning of a picture according to an embodiment of the invention, i.e. of the picture into one or more sub picture(s). A subpicture represents a picture portion (a part or portion of a picture) that covers a rectangular region of the picture. Each subpicture may have a different size and coding parameter(s) from another subpicture. Sub-pictures layout i.e. the geometry of the subpictures in a picture (e.g. as defined using position and dimensions/width/height of the subpicture) permits to group a set of slice(s) of the picture and may constrain (i.e. impose a restriction on) the temporal motion prediction between two pictures.

In FIG. 2, the tile partitioning of the picture 201 is a 4×5 tile grid. The slice partitioning defines 24 slices that consists in one slice per one tile except for the last tile column on the right hand side, for which each tile is divided into two slices (i.e. the slice comprises a partial tile). The picture 201 is also divided into two sub pictures 202 and 203. The subpictures are defined as one or more slices forming a rectangular region. The subpicture 202 (shown as dotted region) comprises the slices in the first three tile columns (starting from the left) and the subpicture 203 (shown as hatched region with diagonal lines on them) the remaining slices (in the last two tile columns on the right hand side). As shown in FIG. 2, VVC7 and embodiments of the invention provide a partitioning scheme that allows defining a single slice partitioning and a single tile partitioning at picture level (e.g. per picture using syntax elements provided in the PPS). The subpicture partitioning applies on top of the tile and slice partitioning. Another aspect of subpictures is that each subpicture is associated with a set of flag(s). This makes it possible (using one or more of the set of flag(s)) to indicate that the temporal prediction is constrained to use data from a reference frame that is part of the same subpicture (e.g. temporal prediction is restricted so that predictor for the subpicture cannot use reference data from another subpicture). For example, referring to FIG. 2, a CTB 204 belongs to the subpicture 202. When it is indicated that the temporal prediction is constrained for subpicture 202, the temporal prediction for the subpicture 202 cannot use a reference block (or reference data) coming from the subpicture 203. As a result, the slices of the subpicture 202 are encodable/decodable independent of the slices of the subpicture 203. This characteristic/attribute/property/capability is useful in viewport dependent streaming that comprises segmenting an omnidirectional video sequence into spatial parts, each representing a particular viewing direction of the 360 (degrees) content. The viewer can then select the segments that correspond to the desired/relevant viewing direction and, using this characteristic of the subpictures, it can encode/decode the segment without accessing data from the remaining parts of the 360 content.

Another usage of subpictures is to generate streams with regions of interest. Subpicture provides a spatial representation for these regions of interest that can be encoded/decoded independently. Subpictures are designed to enable/allow easy access to coded data corresponding to these regions. As a result, it is possible to extract coded data corresponding to a subpicture and generate a new bitstream that comprises data for only the single subpicture or a combination/composition of the subpicture with one or more other subpicture(s), i.e. it can improve the flexibility and scalability using subpicture based bitstream generation.

3.3 A Bitstream

Figure 3:
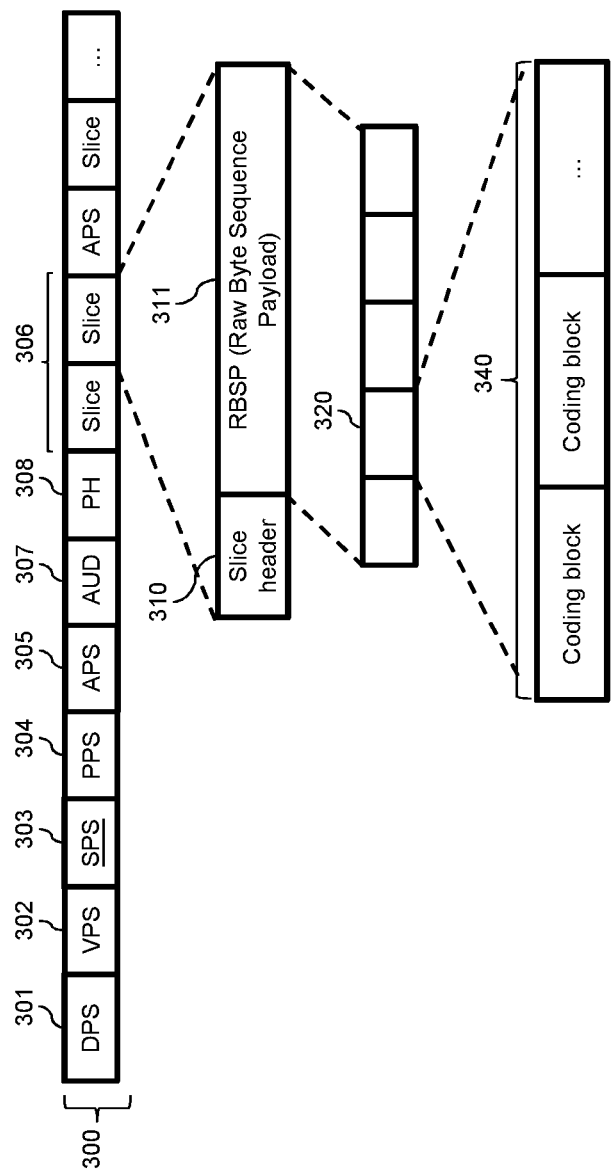
FIG. 3 illustrates a bitstream according to an embodiment of the invention.

FIG. 3 illustrates the organisation (i.e. structure, configuration or arrangement) of the bitstream according to an embodiment of the invention which conforms to the requirements of a coding system for VVC7. A bitstream 300 is composed of data representing/indicating an ordered sequence of syntax elements and coded (image) data. The syntax elements and coded (image) data are placed (i.e. packaged/grouped) into NAL units 301-308. There are different NAL unit types. The network abstraction layer (NAL) provides the ability/capability to encapsulate the bitstream into packets for different protocols, like Real Time Protocol/Internet Protocol (RTP/IP), ISO Base Media File Format, etc. The network abstraction layer also provides a framework for packet loss resilience.

NAL units are divided into VCL NAL units and non-VCL NAL units, VCL stands for Video Coding Layer. The VCL NAL units contain the actual encoded video data. The non-VCL NAL units contain additional information. This additional information may be parameters needed for the decoding of the encoded video data or supplemental data that may enhance usability of the decoded video data. NAL units 306 in FIG. 3 correspond to slices (i.e. they include the actual encoded video data for the slices) and constitute the VCL NAL units of the bitstream.

Different NAL units 301-305 correspond to different parameter sets, these NAL units being non-VCL NAL units. The DPS NAL unit 301, stands for Decoding Parameter Set NAL unit, contains parameters that are constant for a given decoding process. VPS NAL unit 302, VPS stands for Video Parameter Set NAL unit, contains parameters defined for the whole video (e.g. the whole video comprises one or more sequence(s) of pictures/images), and thus are applicable when decoding the encoded video data of the whole bitstream. The DPS NAL unit may define parameters more static (in the sense that they are stable and do not change as much during the decoding process) than the parameters in the VPS NAL unit. In other words, the parameters of DPS NAL unit change less frequently than the parameters of the VPS NAL unit. The SPS NAL unit 303, SPS stands for Sequence Parameter Set, contains parameters defined for a video sequence (i.e. a sequence of picture(s) or image(s)). In particular, the SPS NAL unit may define the subpictures layout and associated parameters of the video sequence(s). The parameters associated with each subpicture specify the coding constraints applied to the subpicture. According to a variant, it comprises a flag indicating that the temporal prediction between subpictures is restricted so that the data coming from the same subpicture are available for use during the temporal prediction process. Another flag may enable or disable the loop filter(s) (i.e. the post filtering) across the subpicture boundaries.

The PPS NAL unit 304, PPS stands for Picture Parameter Set, contains parameters defined for a picture or a group of pictures. The APS NAL unit 305, APS standing for Adaptation Parameter Set, contains parameters for loop filters typically the Adaptive Loop Filter (ALF) or the reshaper model (or luma mapping with chroma scaling model) or the scaling matrices that are used at the slice level. The bitstream may also contain SEI NAL units (not shown in FIG. 3), which stands for Supplemental Enhancement Information NAL units. The periodicity of occurrence (or the frequency of inclusion) of these parameter sets (or NAL units) in the bitstream is variable. A VPS that is defined for the whole bitstream may occur only once in the bitstream. By contrast, an APS that is defined for a slice may occur once for each slice in each picture. In practice, different slices can rely on (e.g. refer to) the same APS and thus there are generally fewer APS NAL units than slices in the bitstream for a picture.

The AUD NAL unit 307 is an Access Unit Delimiter NAL unit which separates two access units. An access unit is a set of NAL units which may comprise one or more coded picture(s) with the same decoding timestamp (i.e. a group of NAL units which relate to one or more coded picture(s) having the same timestamp).

The PH NAL unit 308 is a Picture Header NAL unit which groups parameters common to a set of slices of a single coded picture. The picture may refer to one or more APS to indicate the AFL parameters, reshaper model and the scaling matrices used by the slices of the Picture.

Each of the VCL NAL units 306 contains video/image data for a slice. The slice may correspond to the whole picture or subpicture, a single tile or a plurality of tiles or a fraction of a tile (a partial tile). For example, the slice of FIG. 3 contains several tiles 320. A slice is composed of a slice header 310 and a raw byte sequence payload (RBSP) 311 that contains the coded pixels/component sample data encoded as coding blocks 340.

The syntax of the PPS as in VVC7 comprises a syntax element that specifies the size of the picture in luma samples and also a syntax element for specifying the partitioning of each picture in tiles and slices.

The PPS contains syntax elements that make it possible to determine (i.e. capable of determining) a slice location in a picture/frame. Since a subpicture forms a rectangular region in the picture/frame, it is possible to determine a set of slices, the parts of tiles or the tiles that belong to a subpicture from the Parameter Sets NAL units (i.e. one or more of the DPS, VPS, SPS, PPS, and APS NAL units).

Encoding and Decoding Processes 3.4 An Encoding Process

Figure 4:
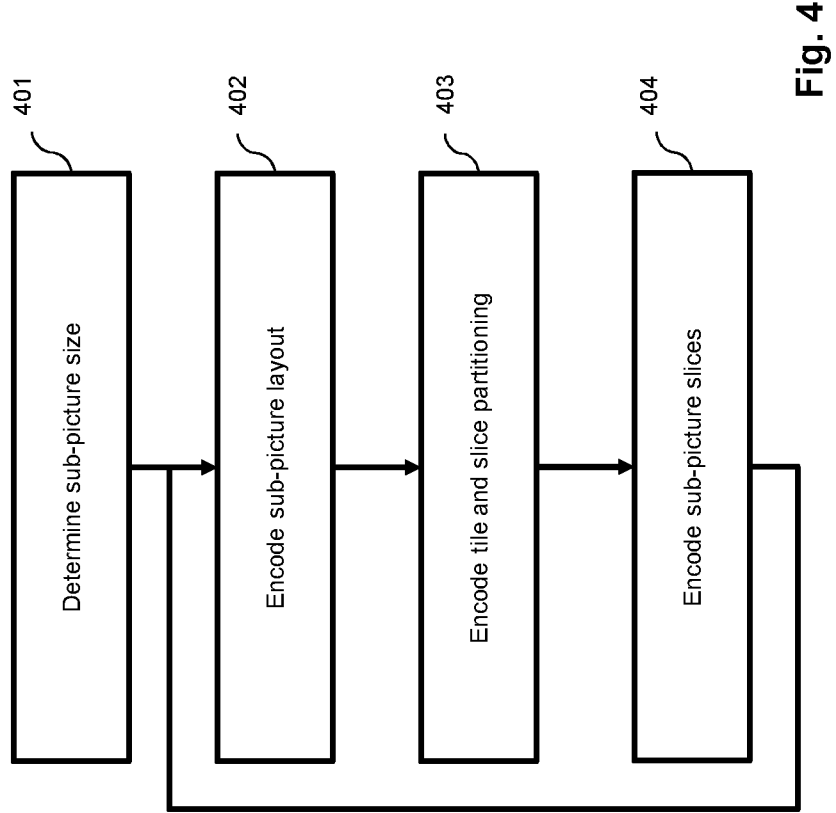
FIG. 4 is a flow chart illustrating an encoding process according to an embodiment of the invention.

FIG. 4 illustrates an encoding method for encoding a picture of a video into a bitstream according to an embodiment of the invention.

In the first step 401, the picture is divided into subpictures. For each subpicture, the size of the subpicture is determined as a function of the spatial access granularity required by the application (e.g. the subpicture size can be expressed as a function of the size/scale/granularity level of the regions/spatial part/areas in the picture that an application/usage scenario needs, the subpicture size being capable of being small enough to contain a single region/spatial part/area). Typically, for viewport dependent streaming approach the subpicture size is set to cover a predetermined range for the field of view (e.g. a range of 60° degree horizontal field of view). For adaptive streaming of regions of interest, the width and height of each subpicture are made to be dependent on the region of interests present in the input video sequence. Typically, the size of each subpicture is made to contain one region of interest. The size of the subpicture is determined in luma sample units or in multiples of the size of the CTBs. In addition, the location of each subpicture in the coded picture is determined in step 401. Locations and sizes of the subpictures form the subpicture layout information which is typically signalled in a non-VCL NAL unit such as a Parameter Set NAL unit. For example, the subpicture layout information is coded in the SPS NAL unit in a step 402.

The SPS syntax for such a SPS NAL unit typically contains the following syntax elements:

|  | Descriptor |
|---|---|
| seq_parameter_set_rbsp( ) { | |
| [...] | |
|   subpics_present_flag | u(1) |
|   if( subpics_present_flag ) { | |
|     sps_num_subpics_minus1 | u(8) |
|     for( i = 0; i <= sps_num_subpics_minus1; i++ ) { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|     } | |
|   } | |
| [...] | |

The descriptor column gives the encoding method used for encoding the syntax element, e.g. u(n) where n is an integer value means that the syntax element is encoded using n bits, and ue(v) means that the syntax element is encoded using unsigned integer 0-th order Exp-Golomb-coded syntax element with the left bit first that is a variable length encoding. se(v) is equivalent to ue(v) but for sign integer. u(v) means the syntax element is coded using a fixed length coding with a specific length in bits determined from other parameters.

The presence of subpicture signalling in a bitstream for the picture depends on the value of a flag subpics_present_flag. When this flag is equal to 0, it indicates that the bitstream does not contain information related to partitioning the picture into one or more subpicture(s). In such a case, it is inferred that there is a single subpicture that covers the whole picture. When this flag is equal to 1, a set of syntax elements specify the layout of subpictures in a frame (i.e. the picture): the signalling comprises using a loop (i.e. a programming structure for repeating a sequence of instructions until a specific condition is met) to determine/define/specify the subpictures of the picture (the number of subpictures in the picture is coded with sps_num_subpics_minus1 syntax element), which comprises defining the location and the size of each subpicture. The index for this "for loop" is the subpicture index. The syntax elements subpic_ctu_top_left_x[i] and subpic_ctu_top_left_y[i] correspond respectively to the column index and the row index of the first CTU of the i-th subpicture. The subpic_width_minus1 [i] and subpic_height_minus[i] syntax elements signal the width and height of the i-th subpicture in CTU units.

In addition to the subpicture layout, the SPS specifies constraints for subpicture boundaries: e.g. subpic_treated_as_pic_flag[i] equal to 1 indicates that the boundaries of the i-th subpicture are treated as picture boundaries for temporal prediction. It ensures that coded blocks of the i-th subpicture are predicted from data of reference pictures which belong to the same subpicture. When equal to 0, this flag indicates that the temporal prediction may or may not be constrained. The second flag (loop_filter_across_subpic_enabled_flag[i]) specifies if the loop filtering process is allowed to use data (typically pixels value) from another subpicture. These two flags make it possible to indicate that subpictures are coded independent of the other subpictures or not. This information is useful in determining if the subpicture can be extracted, derived from, or merged with other subpictures.

In a step 403, an encoder determines the partitions in tiles and slices in the pictures of the video sequence and describes these partitionings in one non-VCL NAL unit such as the PPS. This step is further described later with reference to the FIG. 6. The signalling of the slice and tile partitioning is constrained by the subpicture such that each subpicture comprises at least one slice and either a part of a tile (i.e. a partial tile) or one or more tile(s).

In a step 404, the at least one slice forming the subpicture is encoded in the bitstream.

3.5 A Decoding Process

FIG. 5 illustrates the general decoding process of a slice according to an embodiment of the invention. For each VCL NAL unit, the decoder determines the PPS and the SPS that applies to the current slice. Typically, it determines the identifiers of the PPS and the SPS in use for the current picture. For example, the Picture Header of the slice signals the identifier of the PPS in use. The PPS associated with this PPS identifier then also refers to a SPS using another identifier (an identifier for a SPS).

In a step 501 the decoder determines subpicture partition, e.g. determines the size of the subpictures of the picture/frame, typically its width and height by parsing the parameter sets that describes/indicates the subpicture layout. For VVC7 and the embodiments conforming to this part of VVC7, the parameter set including information for determining this subpicture partition is the SPS. In a second step 502, the decoder parses syntax elements of one parameter set NAL unit (or non VCL NAL unit) related to the partitioning of the Picture into tiles. For example, for a VVC7 conforming stream, tile partitioning signalling is in the PPS NAL unit. During this determination step, the decoder initialises a set of variables which describe/define the characteristics of the tiles present in each subpicture. For example, it may determine the following information for the i-th subpicture (see step 601 of FIG. 6):

- A flag that indicates if the subpicture contains a fraction of a tile, i.e. a partial tile (see step 603 of FIG. 6)
- An integer value that indicates the number of tiles in the subpicture (step 602 of FIG. 6)
- An integer value specifying the width of the subpicture in tiles units (step 604 of FIG. 6)
- An integer value specifying the height of the subpicture in tiles units (step 604 of FIG. 6)
- The list of the tile index present in the subpicture in a raster scan order (step 605 of FIG. 6)

This FIG. 6 illustrates signalling of a slice partitioning according to an embodiment of the invention, which involves determination steps which can be used in both the encoding and decoding processes.

In a step 503, the decoder relies on the signalling of the slice partition (in one non-VCL NAL unit, e.g. typically in the PPS for VVC7) and the previously determined information to infer (i.e. derive or determine) the slice partitioning for each subpicture. In particular, the decoder may infer (i.e. derive or determine) the number of slices, width and height of one or more of the slices. The decoder may also obtain information present in the slice header to determine the decoding location of the CTB present in the slice data.

In a final step 504, the decoder decodes the slices of the subpictures forming the picture at the location determined in step 503.

Signalling the Partitioning

3.6 Signalling of the Slice Partitioning

According to an embodiment of the invention, a slice may consist of an integer number of complete tiles or an integer number of complete and consecutive CTU rows or columns within a tile of a picture (the latter possibility means a slice is capable of comprising a partial tile as long as the partial tile comprises a consecutive CTU rows or columns).

Two modes of slices may also be supported/provided for use, namely a raster-scan slice mode and a rectangular slice mode. In the raster-scan slice mode, a slice contains a sequence of complete tiles in a tile raster scan order of a picture. In the rectangular slice mode, a slice contains either a number of complete tiles that collectively form a rectangular region of the picture or a number of consecutive complete CTU rows (or columns) of one tile that collectively form a rectangular region of the picture. Tiles within a rectangular slice are scanned in a tile raster scan order within the rectangular region corresponding to that slice.

The VVC7's syntax for specifying the slice structure (layout and/or partitioning) is independent of VVC7's syntax for the subpicture. For example, slice partitioning (i.e. partitioning of a picture into slices) is made on top of (i.e. based on or with reference to) the tile structure/partitioning without a reference to subpicture (i.e. without referring to a syntax element used for forming a subpicture). On the other hand, VVC7 imposes some restrictions on (i.e. constrains) subpictures, e.g. a subpicture must contain one or more slices and a slice header includes the slice_address syntax element which is an index of the slice in relation to its subpicture (i.e. an index defined for the associated subpicture such as an index of the slice among the slices in the subpicture). VVC7 also only allows a slice comprising a partial tile in the rectangular slice mode, and the raster scan slice mode does not define such a slice which includes a partial tile. The current syntax system used in VVC7 does not enforce all these constraints by design and hence an implementation of this syntax system lead to a system which is prone to generating bitstreams which are not in conformance with VVC7 specification/requirements.

So embodiments of the invention use information from the subpicture layout definition to specify the slice partition to try to provide a better coding efficiency for the subpicture, tile and slice signalling.

The requirement for having capacity to define multiple slices within a tile (also referred to as "tile fraction" slices or slices comprising a partial tile) came from the omnidirectional streaming requirements. It was identified that there is a need to define slices within a tile for BEAMER (Bitstream Extraction And MERging) operations of OMAF stream. This means a "tile-fraction" slice could be present in different subpictures to allow BEAMER operations, which then means it makes little sense to have a subpicture containing one complete tile with multiple slices.

Following first three embodiments of the invention (Embodiment 1, Embodiment 2 & Embodiment 3) define a slice partition determination and signalling based on a subpicture. The first Embodiment 1 includes a syntax system which disallows/prevents/forbids a subpicture from containing multiple "tile-fraction" slices, while the second Embodiment 2 includes a syntax system which allows/permits it only when the subpicture contains at most one tile (i.e. if the subpicture contains more than one tile, all its slices contain an integer number of complete tiles). Embodiment 3 provides an explicit signalling of the usage of a "tile-fraction" slice. When a "tile-fraction" slice is not used, it avoids signalling syntax elements related to such a slice, which can improve the coding efficiency of the slice partition signalling. Embodiments 1-3 allow/permit use of a tile-fraction slice in the rectangular slice mode only.

The fourth Embodiment 4 is an alternative to the first three embodiments, wherein a unified syntax system is used to allow/permit use of a tile-fraction slice in both the raster scan and rectangular slice mode. The fifth Embodiment 5 is an alternative to the other embodiments, wherein the subpicture layout and the slice partitioning is not signalled in the bitstream and inferred (i.e. determined or derived) from the tile signalling.

Embodiment 1

In a first embodiment Embodiment 1, the syntaxes for slice partition of VVC7 are modified to avoid specifying numerous constraints which are difficult to implement correctly and also to rely on the subpicture layout to infer/derive parameters for slice partitioning, e.g. a size of the slices. Since subpictures are represented by (i.e. consist of) a set/group of complete slices, it is possible to infer the size of a slice when a subpicture contains a single slice. Similarly, from the number of slices in a subpicture and the sizes of earlier processed/encountered slices in the subpicture, the size of the last slice can be inferred/derived/determined.

In Embodiment 1, a slice is allowed to comprise a fraction/part of a tile (i.e. a partial tile) only when the slice covers the full/whole subpicture (in other words, there is a single slice in the subpicture). The signalling of the slice size is necessary when there are more than one slices in the subpicture. On the other hand, the slice size is the same as the subpicture size when there is a single slice in the subpicture. As a result, when the slice comprises a fraction of a tile, the slice size is not signalled in the parameter set NAL unit (because it is the same as the subpicture size). So it is possible to constrain that the slice width and height are in unit of tiles only for the slice size signalling scenario.

The syntax of the PPS for this embodiment comprises specifying the number of slices included in each subpicture. When the number of slices is greater than 1, the sizes (width and height) of the slices is expressed in unit of tiles. The size of the last slices is not signalled and inferred/derived/determined from the subpicture layout as mentioned above.

According to a variant of this embodiment, the PPS syntax contains the following syntax elements with the following semantics (i.e. definitions or functions):

PPS Syntax

| | Descriptor |
|---|---|
| pic_parameter_set_rbsp( ) { | |
|   pps_pic_parameter_set_id | ue(v) |
|   [...] | |
|   pps_num_subpics_minus1 | ue(v) |
|   [...] | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |

|  | Descriptor |
|---|---|
|     tile_row_height_minus1[ i ] | ue(v) |
|    rect_slice_flag | u(1) |
|    if( rect_slice_flag ) { |  |
|     single_slice_per_subpic_flag | u(1) |
|     if(!single_slice_per_subpic_flag ) { |  |
|      tile_idx_delta_present_flag | u(1) |
|      for( i = 0; i <= pps_num_subpic_minus1; i++ ) { |  |
|       num_slices_in_subpic_minus1[ i ] | ue(v) |
|       for( j = 0; j < num_slices_in_subpic_minus1; j++ ) { |  |
|        slice_width_in_tiles_minus1[ i ][ j ] | ue(v) |
|        slice_height_in_tiles_minus1[ i ][ j ] | ue(v) |
|        if( tile_idx_delta_present_flag |  |
|         && j < num_slices_in_subpic_minus1 ) |  |
|         tile_idx_delta[ i ][ j ] | se(v) |
|       } |  |
|      } |  |
|     } |  |
|    } |  |
|    loop_filter_across_tiles_enabled_flag | u(1) |
|    loop_filter_across_slices_enabled_flag | u(1) |
| } |  |

PPS Semantics

The slices are defined per subpicture. A "for loop" is used with num_slices_in_subpic_minus1 syntax element to form/process the correct number of slices in that particular subpicture. The syntax element num_slices_in_subpic_minus1[i] indicates the number of slices (in the subpicture which has a subpicture index equal to i) minus 1, i.e. the syntax element indicates a value which is one less that the number of slices in the subpicture. When equal to 0, it indicates that subpicture contains a single slice of size equal to the subpicture size. When the number of slices is greater than 1, the sizes of the slices are expressed in units of integer number of tiles. The size of the last slice is inferred from the subpicture size (and the sizes of the other tiles in the subpicture). With this approach, it is possible to define a "tile-fraction" slice when it covers a complete subpicture with the following semantics for the syntax elements:

pps_num_subpics_minus1 plus 1 specifies the number of subpictures in the coded pictures referring to the PPS. It is a requirement of bitstream conformance that the value of pps_num_subpic_minus1 shall be equal to sps_num_subpics_minus1 (which is the number of subpicture defined at SPS level).

single_slice_per_subpic_flag equal to 1 specifies that each subpicture consists of one and only one rectangular slice. single_slice_per_subpic_flag equal to 0 specifies that each subpicture may consist one or more rectangular slices. When subpics_present_flag is equal to 0, single_slice_per_subpic_flag shall be equal to 0. When single_slice_per_subpic_flag is equal to 1, num_slices_in_pic_minus1 is inferred to be equal to sps_num_subpics_minus1 (which is the number of subpicture defined at SPS level).

num_slices_in_subpic_minus1[i] plus 1 specifies the number of rectangular slices in the i-th subpicture. The value of num_slices_in_subpic_minus1 shall be in the range of 0 to MaxSlicesPerPicture−1, inclusive, where MaxSlicesPerPicture is specified in Annex A. When no_pic_partition_flag is equal to 1, the value of num_slices_in_subpic_minus1[0] is inferred to be equal to 0.

This syntax element determines the length of the slice_address of the slice headers which is Ceil(log$_2$(num_slices_in_subpic_minus1 [SubPicIdx]+1)) bits (wherein SubPicIdx is the index of the subpicture of the slice). The value of slice_address may be in the range of 0 to num_slices_in_subpic_minus1[SubPicIdx], inclusive.

tile_idx_delta_present_flag equal to 0 specifies that tile_idx_delta values are not present in the PPS and that all rectangular slices in all the subpictures of the picture referring to the PPS are specified in raster order. tile_idx_delta_present_flag equal to 1 specifies that tile_idx_delta values may be present in the PPS and that all rectangular slices in all the subpictures of the picture referring to the PPS are specified in the order indicated by the values of tile_idx_delta.

slice_width_in_tiles_minus1[i][j] plus 1 specifies the width of the j-th rectangular slice in units of tile columns in the i-th subpicture. The value of slice_width_in_tiles_minus1[i][j] shall be in the range of 0 to NumTileColumns−1, inclusive (wherein NumTileColumns is the number of tile columns in the tile grid). When not present, the value of slice_width_in_tiles_minus1[i][j] is inferred as a function of the subpicture size.

slice_height_in_tiles_minus1[i][j] plus 1 specifies the height of the j-th rectangular slice in units of tile rows in the i-th subpicture. The value of slice_height_in_tiles_minus1 [i][j] shall be in the range of 0 to NumTileRows−1, inclusive (wherein NumTileRows is the number of tile rows in the tile grid). When not present, the value of slice_height_in_tiles_minus1[i][j] is inferred as a function of the i-th subpicture size.

tile_idx_delta[i][j] specifies the difference in tile index between the j-th rectangular slice and the (j+1)-th rectangular slice of the i-th subpicture. The value of tile_idx_delta[i][j] shall be in the range of −NumTilesInPic[i]+1 to NumTilesInPic[i]−1, inclusive (wherein NumTilesInPic[i] is the number of tiles in the picture. When not present, the value of tile_idx_delta[i][j] is inferred to be equal to 0. In all other cases, the value of tile_idx_delta[i][j] shall not be equal to 0.

So according to this variant:

A subpicture is a rectangular region of one or more slices within a picture. The address of the slice is defined in relation to the subpicture. This association/relationship between a subpicture and its slices is reflected in the syntax system which define the slice in the "for loop" that applies to each subpicture.

By design, it avoids unwanted partitionings that can lead to having more than one tile-fraction slices from two different tiles in the same subpicture.

It is possible to deduce the slice partitioning from both tile and subpicture partitioning which improves the coding efficiency of the signalling.

According to a further variant of this variant, this deduction/derivation of the slice partitioning is performed using the following process. For rectangular slices, the list NumCtuInSlice[i] for i ranging from 0 to num_slices_in_pic_minus1, inclusive, specifying the number of CTU in the i-th slice, and the matrix CtbAddrinSlice[i][j] for i ranging from 0 to num_slices_in_pic_minus1, inclusive, and j ranging from 0 to NumCtuInSlice[i]−1, inclusive, specifying the picture raster scan address of the j-th CTB within the i-th slice, are derived as follows when single_slice_per_subpic_flag equal to 0:

```
   sliceIdx = 0
   for( i =0; i <= pps_num_subpic_minus1;i++ ) {
      NumCtuInSlice[ sliceIdx ] = 0
      tileIdx = subpicTileTopLeftX[ i ] + subpicTileTopLeftY[ i ]; j++ ) {
      subpicTopLeftTileIdx = tileIdx;
      for( j = 0; j <= num_slices_in_subpic_minus1[ i ]; j++ ) {
         NumCtuInSLice[ sliceIdx ] = 0
         tileX = tileIdx % NumeTileColumns
         tileY = tileIdx / NumTileColumns
         if( j = = num_slices_in_subpic_minus1[ i ]) {
            // Infer last slice size
            slice_width_in_tiles_minus1[ i ][ j ] = subPictureWidthInTiles[ i ] - 1 - (tileX
 - subpicTileTopLeftX[ i ])
            slice_height_in_tiles_minus1[ i ][ j ] = subPictureHeightInTiles[ i ] - 1 -
(tileY - subpicTileTopLeftY[ i ])
         }
         if(tileFractionDubPicture[ i ] ) {
            // Tile fraction subpicture
            ctbY = subpic_ctu_top_left_y[ i ]
            ctbX = subpic_ctu_top_left_x[ i ]
            AddCtbsToSlice( sliceIdx, ctbX, ctbX + subpic_width_minus1[ i ] + 1,
ctbY, ctbY + subpic_height_minus1[ i ] + 1 )
         } else
            // Add each tile of the slice.
            for( 1 = 0; 1 <= slice_height_in_tiles_minus1[ i ][ j ]; 1++ )
   for( k = 0; k <= slice_width_in_tiles_minus1[ i ][ j ]; k++ )
               AddCtbsToSlice( sliceIdx, tileColBd[ tileX + k ], tileColBd[ tileX + k +
1],
tileRowBd[ tileY + 1], tileRowBd[ tileY + 1 + 1 ] )
         if (j < num_slices_in_subpic_minus1[i] ) {
            if( tile_idx_delta_present_flag [ i ])
               tileIdx += tile_idx_delta[ i ][ j ]
            else {
               tileIdx += slice_width_in_tiles_minus1[ i ][ j ] + 1
               tileX = tileIdx % NumTileColumns
               if( tileX < subpicTileTopLeftX[ i ] || tileX >= subpicTileTopLeftX[ i ] +
subPictureWidthInTiles[ i ])
                  tileIdx = subpicTileTopLeftX[ i ] + (tileY +
slice_height_in_tiles_minus1[ i ][ j ] + 1) * NumeTileColumns
         }
      }
      sliceIdx++
   }
}
```

Wherein the function AddCtbsToSlice(sliceIdx, startX, stopX, startY, stopY) fills the CtbAddrinSlice array of the Slice with an index equal to SliceIdx. It fills the array with the CTB address in a raster scan order for CTBs with a vertical address for the CTB row being between startY and stopY; and a horizontal address for CTB column being between startX and stopX.

This process comprises applying a processing loop on each subpicture. For each subpicture, the tile index of the first tile in the subpicture is determined from horizontal and vertical addresses of the first tile of the subpicture (i.e. subpicTileTopLeftX[i] and subpicTileTopLeftX[i] variables) and the number of tile columns specified by the tile partition information. This value infers/indicates/represents the index of the first tile in the first slice of the subpicture. For each subpicture, a second processing loop is applied to each slice of the subpicture. The number of slices is equal to one plus the num_slices_in_subpics_minus1[i][j] variable which is either coded in the PPS or inferred/derived/determined from other information included in the bitstream. When the slice is the last one of the subpicture, the width of the slice in tiles is inferred/deduced/derived/determined to be equal to the subpicture width in tile minus the horizontal address of the column of the first tile of the slice plus the horizontal address of the column of the first tile of the subpicture. Similarly, the height of the slice in tiles is inferred/deduced/derived/determined to be equal to the subpicture height in tile minus the vertical address of the row of the first tile of the slice plus the vertical address of the row of the first tile of the subpicture. The index of the first tile of the previous slice, is either coded in the slice partitioning information (e.g. as a difference with the tile index of first tile of the previous slice) or it is inferred/deduced/derived/determined to be equal to the next tile in the raster scan order of tiles in the subpicture.

When the subpicture contains a fraction of tile (i.e. a partial tile), the width and height in CTUs of the slice is inferred/deduced/derived/determined to be equal to the width and height of the subpicture in CTUs units. The CtbAddrinSlice[sliceIdx] array is filled with the CTUs of the subpicture in the raster scan order. Otherwise, the subpicture contains one or more tiles, and CtbAddrinSlice[sliceIdx] array is filled with the CTUs of the tiles which are included in the slice. The tiles included in the slices of the subpicture are the one with a vertical address of tile column, the vertical address defined from the range of [tileX, tileX+slice_width_in_tiles_minus1[i][j]], and a horizontal address of tile column, the horizontal address defined from the range of [tileY, tileY+slice_height_in_tiles_minus1[i][j]], wherein tileX is the vertical address of the tile column of the first tile of the slice; tileY is the horizontal address of the tile row of the first tile of the slice; i the subpicture index and j the index of the slice in the subpicture.

Finally, the processing loop on the slices includes a determination step for determining the first tile in the next slice of the subpicture. When a tile index offset (tile_idx_delat[i][j]) is coded (tile_idx_delta_present_flag[i] equals to 1), the tile index of the next slice is set equal to the index of the first tile of the current slice plus the value of the tile index offset value. Otherwise (i.e. when the tile index offset is not coded), the tileIdx is set equal to the tile index of the first tile of the subpicture plus the product of the number of tile columns in the picture and the height in tile units minus 1 of the current slice.

According to a further variant, when a subpicture includes a partial tile, instead of signalling the number of slices included in the subpicture in the PPS, the subpicture is inferred/deduced/derived/determined to consist of this partial tile. For example, the following alternative PPS syntax may be used instead to do this.

Alternative PPS Syntax

In further variant, the number of slices in the subpicture is inferred to be equal to one when the subpicture represents a fraction of a tile (i.e. the subpicture includes a partial tile). The coded data size for the syntax elements is further reduced which improves the compression of the stream as the number of subpicture representing a tile fraction (i.e. the number of subpictures including a partial tile) increases. The syntax of the PPS is for example the following:

| | Descriptor |
|---|---|
| pic_parameter_set_rbsp( ) { | |
|   pps_pic_parameter_set_id | ue(v) |
|   [...] | |
|   pps_num_subpics_minus1 | ue(v) |
|   [...] | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     rect_slice_flag | u(1) |
|     if( rect_slice_flag ) { | |
|       single_slice_per_subpic_flag | u(1) |
|       if(!single_slice_per_subpic_flag ) { | |
|         tile_idx_delta_present_flag | u(1) |
|         for( i = 0; i < pps_num_subpic_minus1; i++ ) { | |
|           if(!tileFractionSubpicture[ i ]) | |
|             num_slices_in_subpic_minus1[ i ] | ue(v) |
|           for( j = 0; j < num_slices_in_subpic_minus1; j++ ) { | |
|             slice_width_in_tiles_minus1[ i ][ j ] | ue(v) |
|             slice_height_in_tiles_minus1[ i ][ j ] | ue(v) |
|             if( tile_idx_delta_present_flag && j < num_slices_in_subpic_minus1 ) | |
|               tile_idx_delta[ i ][ j ] | se(v) |
|             } | |
|           } | |
|         } | |
|       } | |
|     loop_filter_across_tiles_enabled_flag | u(1) |
|     loop_filter_across_slices_enabled_flag | u(1) |
| } | |

The new semantic/definition of num_slices_in_subpic_minus1[i] is the following:

num_slices_in_subpic_minus1[i] plus 1 specifies the number of rectangular slices in the i-th subpicture. The value of num_slices_in_subpic_minus1 shall be in the range of 0 to MaxSlicesPerPicture−1, inclusive, where MaxSlicesPerPicture is specified in Annex A. When not present the value of num_slices_in_subpic_minus1[i] is inferred to be equal to 0 for i in range of 0 to pps_num_subpic_minus1 inclusive.

The tileFractionSubpicture[i] variable specifies if the i-th subpicture covers a fraction of tile (a partial tile), i.e. the size of the subpicture is strictly lower (i.e. less) than the tile for which the first CTU of the subpicture belongs to.

The decoder determines this variable from the subpicture layout and the tile grid information as follows: The tileFractionSubpicture[i] is set equal 0 when both top and bottom horizontal boundaries of the subpicture are tile boundaries. By contrast, when at least one of the top or bottom horizontal subpicture boundaries is not a tile boundary tileFractionSubpicture[i] is set equal 1.

In yet another further variant, the presence of slice_width_in_tiles_minus1[i][j] and slice_height_in_tiles_minus1[i][j], or lack thereof, is inferred from the width and height of the subpicture in tile units. For instance, the variables subPictureWidthInTiles[i] and subPictureHeightInTiles[i] define respectively the width and the height of the i-th subpicture in tile units. When the subpicture is a fraction of a tile, the width of the subpicture is set to 1 (since the fraction of a tile has a width equal to the width of a tile) and the height is set to 0 by convention to indicate that the height of the subpicture is lower than one complete tile. It is understood that any other preset/predetermined value can be used, the main constraint is that the two values are set/determined so that they do not represent a possible subpicture size in tiles. For instance, the values may be set equal to the maximum number of tiles plus 1 in the pictures. In that case, it can be inferred that subpicture is a fraction of a tile since a width or a height of a subpicture that is bigger than the maximum number of tiles is not possible.

These variables are initialized once the tile partitioning is determined (typically based on num_exp_tile_columns_minus1, num_exp_tile_rows_minus1, tile_column_width_minus1[i], and tile_row_height_minus1[i] syntax elements). The process may comprise performing a processing loop on each subpicture. That is, for each subpicture, if the subpicture covers a fraction of a tile, the width and height in tile units of the subpicture are set respectively to 1 and 0. Otherwise, the determination of the width in tiles of the subpicture is determined as follows: the horizontal address of the CTU column of the first CTU of the subpicture (determined from the subpicture layout syntax element subpic_ctu_top_left_x[i] for the i-th subpicture) is used to determine the horizontal address of the tile column of the first tile in the subpicture.

Then, for each tile column of the tile grid, the horizontal addresses of the leftmost and rightmost CTU column of the tile column are determined. When a horizontal address of the CTU column of the first CTU of the subpicture is between these two addresses, the horizontal address indicates the horizontal address of the tile column of the first tile in the subpicture. Same process applies to determine the horizontal address of the tile column which contains the rightmost CTU column of the subpicture. The rightmost CTU column has a horizontal address of CTU column equal to the sum of the horizontal address of the CTU column of the first CTU of the subpicture and the width of the subpicture in CTU unit (subpic_width_minus1[i] plus 1). The width of the subpicture in tile is equal to the difference of the horizontal addresses of the tile column of the last CTU column and of the first CTU of the subpicture. The same principle applies when determining the height of the subpicture in tile units. The process determines the subpicture height in tiles as the difference of the vertical addresses of tile rows of the first CTU of the subpicture and the last CTU row of the subpicture.

In one further variant, when the number of tiles in the subpicture equals the number of slices in the subpicture, slice_width_in_tiles_minus1[i][j] and slice_height_in_tiles_ minus1[i][j] are not present and inferred to be equal to 0. Indeed, in a case of equality, subpicture and slice constraints impose that each slice contains exactly one tile. The number of tiles in a subpicture is equal to one when the subpicture is a tile fraction (tileFractionSubpicture[i] equals to 1). Otherwise, it is equal to the product of subPictureHeightInTiles[i] and subPictureWidthInTiles[i].

In another further variant, when the width of the subpicture in tile units is equal to 1, slice_width_in_tiles_minus1[i][j] is not present and is inferred to be equal to 0.

In another further variant, when the height of the subpicture in tile units is equal to 1, slice_height_in_tiles_minus1[i][j] is not present and is inferred to be equal to 0.

In yet another further variant, any combination of the three preceding further variants is used.

In some of the previous variants, the presence of syntax elements is inferred from the subpicture partition information. When the subpicture partitioning is defined in a different parameter set NAL unit, the parsing of the slice partitioning is dependent on information from the other parameter set NAL unit. This dependency can limit the variant's usage in certain applications since the parsing of the parameter set that includes the slice partitioning cannot be done without storing information from another parameter set. For the decoding of the parameters, i.e. the determination of the values coded by the syntax elements, this dependency is not a limitation since the decoder needs all the parameter sets in use to decode the pixel samples any way (there may be some latency from having to wait for all the relevant parameter sets to be decoded though). As a result, in a further variant the inference of the presence of the syntax elements is enabled only when the subpicture, tile and slice partitioning are signalled in the same parameter set NAL unit. For example, the variables subPictureWidthInTiles[i] specifying the width of the i-th subpicture in units of tiles, subPictureHeightInTiles[i] specifying the height of the i-th subpicture in units of tiles, subpicTileTopLeftX[i] specifying the horizontal address of the column of the first tile in the i-th subpicture, and subpicTileTopLeftY[i] specifying the vertical address of the row of the first tile in the i-th subpicture, for i in range of 0 to pps_num_subpicture_minus1 inclusive, are determined as follows:

```
for (i = 0; i <= pps_num_subpic_minus1; i++ ) {
    tileleftCtb = CtbToTileColBd[subpic_ctu_top_left_x[i]]
    tiletopCtb = CtbToTolRowBd[subpic_ctu_top_left_y[i]]
    tileX = 0;
    while (tileLeftCtb != tileColBd[tileX])
        tileX++;
    tileY = 0;
    while (tiletopCtb != tileRowBd[tileY])
        tileY++:
    subpicTileTopLeftX[ i ] = tileX;
    subpicTileTopLeftY[ i ] = tileY;
    subPictureWidthInTiles[ i ] = 1
    for( ctbAddrX = subpic_ctu_top_left_x[i];
            ctbAddrX <= _ctu_top_left_x[i]+subpic_width_minus1[i];ctbAddrX++) {
        if( ctbAddrx == tileColBd[ tileX + 1 ] ) {
            tileX++
            subPictureWidthInTiles[ i ]++
        }
    }
    subPictureHeightInTiles[ i ] = 1
    for( ctbAddrY = subpic_ctu_top_left_y[i];
            ctbAddrY <= subpic_ctu_top_left_y[i]+subpic_height_minus1[i]; ctbAddrY++ ) {
        if( ctbAddrY == tileRowBd[ tileY + 1 ] ) {
            tileY++
            subPictureHeightInTiles[ i ]++
        }
    }
}
```

The tileFractionSubpicture[i] variable specifying if the subpicture contains a fraction of a tile is derived as follows:

```
for (i = 0; i <= pps_num_subpic_minus1; i++ ) {
    tiletopCtb = CtbToTileRowBd
        [subpic_ctu_top_left_y[i]]
    tileFractionSubpicture [ i ] = 0
    if (tiletopCtb != subpic_ctu_top_left_y[ i ])
        tileFractionSubpicture[ i ] = 1
    else if (subpic_height_minus1[ i ] +
    1 < RowHeight[subpicTileTopLeftY[ i ]] )
        tileFractionSubpicture[ i ] = 1
}
```

Figure 7:
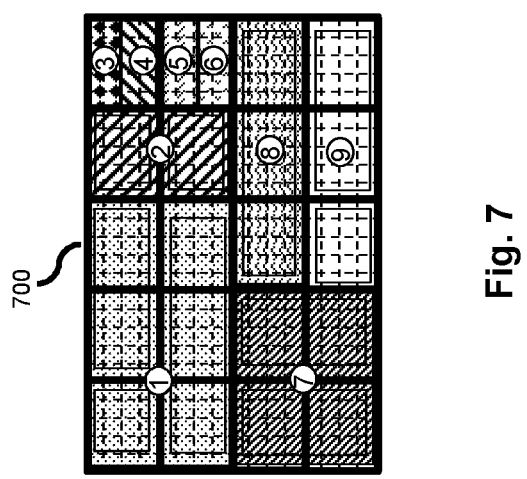
FIG. 7 illustrates examples of a subpicture and a slice partitioning according to an embodiment of the invention.

The list SliceSubpicToPicIdx[i][k], specifying the number of rectangular slices in the i-th subpicture and picture-level slice index of the k-th slice in the i-th subpicture, are derived is derived as follows:

```
sliceIdx = 0
for( i = 0; i <= sps_num_subpics_minus1; i++ )
    for(j=0;j <= num_slices_in_subpic_minus1; j+
        SliceSubpicToPicIdx[ i ][ j ] = sliceIdx++
``` wherein:
CtbToTileRowBd[ctbAddrY] converts the vertical CTB address (ctbAddrY) to a top tile column boundary in CTB units
CtbToTileColBd[ctbAddrX] converts the horizontal CTB address (ctbAddrX) to a left tile column boundary in CTB units
ColWidth[i] is the width of the i-th tile column in CTBs
RowHeight[i] is the height of the i-th tile row in CTBs
tileColBd[i] is the location of the i-th tile column boundary in CTBs
tileRowBd[i] is the location of the i-th tile row boundary in CTBs
NumTileColumns is the number of tile Columns
NumTileRows is the number of tile rows FIG. 7 illustrates an example of the subpicture and the slice partitioning using the signalling of the embodiment/variant/further variant described above. In this example, the picture 700 is divided into 9 subpictures labelled (1) to (9) and a 4×5 tile grid (tile boundaries shown in thick solid lines). The slice partitioning (an area included in each slice is shown in thin solid line which is just inside the slice boundary) is the following for each subpicture:

Subpicture (1): 3 slices which contain respectively 1 tile, 2 tiles and 3 tiles. The heights of the slices are equal to 1 tile and their widths are respectively 1, 2 and 3 in tile units (i.e. the 3 slices consisting of a row of tiles arranged in the horizontal direction)

Subpicture (2): 2 slices of equal size, the size being 1 tile in width and 1 tile in height (i.e. each of the 2 slices consists of a single tile)

Subpictures (3) to (6): 1 "tile-fraction" slice, i.e. a slice consisting of a single partial tile Subpictures (7): 2 slices with sizes of columns of 2 tiles (i.e. each of the 2 slices consists of a column of 2 tiles arranged in the vertical direction)

Subpictures (8): 1 slice of a row of 3 tiles

Subpictures (9): 2 slices having the size of a row of 1 tile and a row of 2 tiles For Subpicture (1), the width and height of the two first slices are coded while the size of the last slice is inferred.

For Subpicture (2), the width and height of the two first slices are inferred since there are two slices for two tiles in the subpicture.

For Subpicture (3) to (6), the number of slices in each subpicture is equal to 1 and the width and height of the slices are inferred to be equal to the subpicture size since each subpicture is a fraction of a tile.

For subpicture (7), the width and height of the first slice and the width and height of last slice are inferred from the subpicture size.

For subpicture (8), the width and height of the slice are inferred to be equal to the subpicture size since there is a single slice in the subpicture.

For subpicture (9), the height of the slices is inferred to be equal to 1 (since the subpicture height in tile is equal to 1) and the width of the first slice is coded while the width of the last slice is equal to the width of the subpicture minus the width of the first slice.

Embodiment 2

In a second embodiment Embodiment 2, the constraint/restriction that the "tile-fraction" slice (i.e. a slice which is a partial tile) shall cover a whole subpicture is relaxed/removed. As a result, a subpicture may contain one or more slices, each slice comprising one or more tiles but also may contain one or more "tile-fraction" slices.

In this embodiment, the subpicture partitioning allows/enables the prediction/derivation/determination of the slice location and size.

According to a variant of this embodiment, following PPS syntax may be used to do this.

PPS Syntax

For example, the PPS syntax is the following:

|  | Descriptor |
| --- | --- |
| pic_parameter_set_rbsp( ) { |  |
|   pps_pic_parameter_set_id | ue(v) |
|   [...] |  |
|   pps_num_subpics_minus1 | ue(v) |
|   [...] |  |
|   no_pic_partition_flag | u(1) |
|   if( !no_pic_partition_flag ) { |  |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) |  |
|       tile_column_width_minus1[ i ] | ue(v) |
|     for( i = 0; i <= num_exp_tile_rows_minus1; i++ ) |  |
|       tile_row_height_minus1[ i ] | ue(v) |
|     rect_slice_flag | u(1) |
|     if( rect_slice_flag ) { |  |
|       single_slice_per_subpic_flag | u(1) |
|       if(!single_slice_per_subpic_flag ) { |  |
|         tile_idx_delta_present_flag | u(1) |
|         for( i = 0; i < pps_num_subpic_minus1; i++ ) { |  |
|           num_slices_in_subpic_minus1[ i ] | ue(v) |
|           for( j = 0; j < num_slices_in_subpic_minus1; j++ ) { |  |
|             slice_width_minus1[ i ][ j ] | ue(v) |
|             slice_height_minus1[ i ][ j ] | ue(v) |
|             if( tile_idx_delta_present_flag && j < num_slices_in_subpic_minus1 && newTileIdxDeltaRequired ) |  |
|               tile_idx_delta[ i ][ j ] | se(v) |
|           } |  |
|         } |  |
|       } |  |
|     } |  |
| } |  |

| | Descriptor |
|---|---|
| loop_filter_across_tiles_enabled_flag | u(1) |
| loop_filter_across_slices_enabled_flag | u(1) |
| } | |

The semantics of the syntax elements single_slice_per_subpic_flag, tile_idx_delta_present_flag, num_slices_in_subpic_minus1[i] and tile_idx_delta[i][j] are the same as in the previous embodiment.

The slice_width_minus1 and slice_height_minus1 syntax elements (parameters) specify the slice size either in tile or CTU units depending on the subpicture partitioning.

The variable newTileIdxDeltaRequired is set equal to one when the last CTU of the slice is the last CTU of a tile. When the slice is not a "tile-fraction" slice, newTileIdxDeltaRequired is equal to 1. When the slice is a "tile-fraction" slice, newTileIdxDeltaRequired is set to 0 if the slice is not the last one of the tile(s) in the slice. Otherwise, it is the last of the tile(s) and newTileIdxDeltaRequired is set to 1.

In a first further variant, subpictures are constrained/restricted to contain fraction-tile slices of a single tile. In this case, if a subpicture contains more than one tiles the size is in tile units. Otherwise, the subpicture contains a single tile or a part of the tile (a partial tile and the slice heights are defined in CTU units. The widths of the slices are necessarily equal to the subpicture width and thus can be inferred and need not be coded in the PPS.

slice_width_minus1[i][j] plus 1 specifies the width of the j-th rectangular slice. The value of slice_width_in_tiles_minus1[i][j] shall be in the range of 0 to NumTileColumns−1, inclusive (wherein NumTileColumns is the number of tile columns in the tile grid). When not present (i.e. when subPictureWidthInTiles[i]*subPictureHeightInTiles[i]==1 or subPictureWidthInTiles[i] equal to 1), the value of slice_width_in_tiles_minus1[i][j] is inferred to be equal to 0.

slice_height_in_tiles_minus1[i][j] plus 1 specifies the height of the j-th rectangular slice in the i-th subpicture. The value of slice_height_in_tiles_minus1[i][j] shall be in the range of 0 to NumTileRows−1, inclusive (wherein NumTileRows is the number of tile rows in the tile grid). When not present (i.e. when subPictureHeightInTiles [i] is equal to 1 and num_slices_in_subpic_minus1[i]==0), the value of slice_height_in_tiles_minus1[i][j] is inferred to be equal to 0.

The variables SliceWidthInTiles[i][j] specifying the width in units of tiles of the j-th rectangle slice of the i-th subpicture, SliceHeightInTiles[i][j] specifying the height in units of tiles of the j-th rectangle slice of the i-th subpicture, SliceHeightInCTUs[i][j] specifying the height in units of CTBs of the j-th rectangle slice of the i-th subpicture, for i in the range of 0 to pps_num_subpic_minus1 and j in the range of 0 to num_slices_in_subpic_minus1[i] are derived as follows:

```
if (subPictureWidthInTiles[i]*subPictureHeightInTiles[i] > 1)
{
for (j = 0; j < num_slices_in_subpic_minus1[i]; j++) {
    SliceWidthInTiles[i][j] = slice_width_minus1[i][j] + 1
    SliceHeightInTiles[i][j] = slice_height_minus1[i][j] +1
}
}
else {
for (j = 0; j < num_slices_in_subpic_minus1[i]; j++)
    SliceWidthInTiles[i][j] = 1
    SliceHeightInTiles[i][j] = 0
    SliceHeightInCTUs = slice_height_minus1[i][j]
}
}
```

With this algorithm, the SliceHeightInCTUs[i][j] is valid only when sliceHeightInTiles[i][j] equals to 0.

In an alternative further variant, a subpicture is allowed to contain tile-fraction slices from several tiles (i.e. slices including partial tiles from more than one tile) with the limitation/restriction/condition that all the subpicture's slices must be tile-fraction slices. Thus, it is not possible to define a subpicture containing a first tile fraction slice including a partial tile of a first tile and a second tile fraction slice including a partial tile of a second tile different from the first tile with another slice covering a third (different) tile in entirety (i.e. the third tile being a complete/whole tile). In this case, if the subpicture contains more slices than tiles in the subpicture, the slice_height_minus1[i][j] syntax element is in CTU units and slice_width_minus1[i][j] is inferred to be equal to subpicture width in CTU units. Otherwise, the size of the slices is in tiles units.

In a further variant, the slice PPS syntax is the following:

| | Descriptor |
|---|---|
| pic_parameter_set_rbsp( ) { | |
|   pps_pic_parameter_set_id | ue(v) |
|   [...] | |
|   pps_num_subpics_minus1 | ue(v) |
|   [...] | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     rect_slice_flag | u(1) |
|     if( rect_slice_flag ) { | |
|       single_slice_per_subpic_flag | u(1) |
|       if(!single_slice_per_subpic_flag ) { | |
|         tile_idx_delta_present_flag | u(1) |
|         for( i = 0; i < pps_num_subpic_minus1; i++ ) { | |
|           num_slices_in_subpic_minus1 | ue(v) |
|           for( j = 0; j < num_slices_in_subpic_minus1; j++ ) { | |
|             if(!sliceInCtuFlag[ i ]) { | |
|       slice_width_in_tiles_minus1[ i ][ j ] | ue(v) |
|       slice_height_in_tiles_minus1[ i ][ j ] | ue(v) |
|       } else | |
|       slice_height_in_ctu_minus1[ i ][ j ] | ue(v) |
|         if( tile_idx_delta_present_flag && i < num_slices_in_subpic_minus1[i ] && newTileIdxDeltaRequired) | |
|           tile_idx_delta[ i ] | se(v) |
|       } | |
|     } | |
|     loop_filter_across_tiles_enabled_flag | u(1) |
|     loop_filter_across_slices_enabled_flag | u(1) |
| } | |

In this further variant, same principle applies except that separate syntax elements define the slice width and height in tile units or the slice height in CTU units depending on whether slices are defined in CTU units. The slice width and height are defined with slice_width_in_tiles_minus1[i][j] and slice_height_in_tiles_minus1[i][j] when the slice is signalled in tiles units while slice_width_in_ctu_minus1[i][j] is used when the width is in CTU units. The variable sliceInCtuFlag[i] equal to 1 indicates the i-th subpicture contains only tile fraction slices (i.e. no whole/complete tile slices in the subpicture). Equal to 0, it indicates the i-th subpicture contains slices which comprises one or more tiles.

The variable sliceInCtuFlag[i] is derived as follows for i in the range of 0 to pps_num_subpic_minus1:

```
if (subPictureWidthInTiles[i]*subPictureHeightInTiles[i] > 1) {
    sliceInCtuFlag[ i ] = 0
}
else {
    sliceInCtuFlag[ i ] = num_slices_in_subpic_minus1[i] > 0
}
```

The determination of the sliceInCtuFlag[i] variable introduces a parsing dependency between the slice and subpicture partitioning information. As a result, in a variant the sliceInCtuFlag[i] is signalled and not inferred when the slice, tile and subpicture partitioning are signalled in different parameter set NAL units.

In a further variant, the subpicture is allowed to contain tile-fraction slices from several tiles without any specific constraints/restrictions. Thus, it is possible to define a subpicture containing a first tile fraction slice including a partial tile of a first tile and a second tile fraction slice including a partial tile of a second tile different from the first tile with another slice covering a third (different) tile in entirety (i.e. the third tile being a complete/whole tile). In this case, when the number of tiles in the subpicture is greater than one, a flag indicates if the slice size is specified in CTU or tile units. For example, the following syntax of the PPS signals slice_in_ctu_flag[i] syntax element which indicates if the slice size of the i-th subpicture is expressed in CTU or tile units. slice_in_ctu_flag[i] equal to 0 indicates the presence of slice_width_in_tiles_minus1[i][j] and slice_height_in_tiles_minus1[i][j] syntax elements and the absence of the slice_height_in_ctu_minus1[i][j], i.e. the slice size is expressed in tile units. slice_in_ctu_flag[i] equal to 1 indicate the presence of the slice_height_in_ctu_minus1[i][j] and the absence of slice_width_in_tiles_minus1[i][j] and slice_height_in_tiles_minus1[i][j] syntax elements, i.e. the slice size is expressed in CTU units.

| | Descriptor |
|---|---|
| pic_parameter_set_rbsp( ) { | |
|   pps_pic_parameter_set_id | ue(v) |
|   [...] | |
|   pps_num_subpics_minus1 | ue(v) |
|   [...] | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     rect_slice_flag | u(1) |
|     if( rect_slice_flag ) { | |
|       single_slice_per_subpic_flag | u(1) |
|       if(!single_slice_per_subpic_flag ) { | |
|         tile_idx_delta_present_flag | u(1) |
|         for( i = 0; i < pps_num_subpic_minus1; i++ ) { | |
|           num_slices_in_subpic_minus1 | ue(v) |
|           for( j = 0; j < num_slices_in_subpic_minus1; j++ ) { | |
|             if(numTilesInSubPicture[ i ] > 1) | |

-continued

| | Descriptor |
|---|---|
|             slice_in_ctu_flag[ i ] | u(1) |
|             if(!slice_in_ctu_flag[ i ]){ | |
|             slice_width_in_tiles_minus1[ i ][ j ] | ue(v) |
|             slice_height_in_tiles_minus1[ i ][ j ] | ue(v) |
|             } else | |
|             slice_height_in_ctu_minus1[ i ][ j ] | ue(v) |
|             if( tile_idx_delta_present_flag && i < num_slices_in_subpic_minus1[ i ] && newTileIdxDeltaRequired) | |
|               tile_idx_delta[ i ] | se(v) |
|           } | |
|         } | |
|       loop_filter_across_tiles_enabled_flag | u(1) |
|       loop_filter_across_slices_enabled_flag | u(1) |
|     } | |

Figure 8:
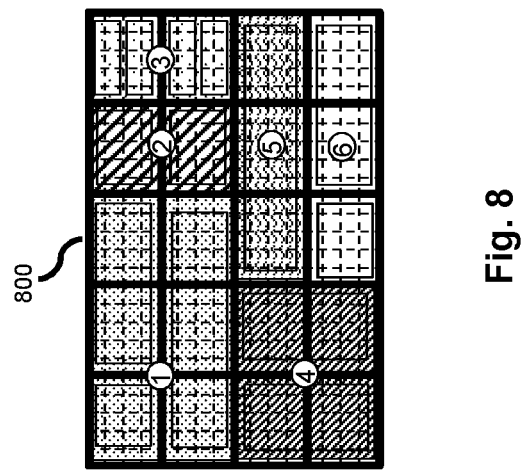
FIG. 8 illustrates examples of a subpicture and a slice partitioning according to an embodiment of the invention.

The FIG. 8 illustrates an example of the subpicture and the slice partitioning using the signalling of the embodiment/variant/further described above. In this example, the picture 800 is divided into 6 subpictures labelled (1) to (6) and a 4×5 tile grid (tile boundaries shown in thick solid lines). The slice partitioning (an area included in each slice is shown in thin solid line which is just inside the slice boundary) is the following for each subpicture:

Subpicture (1): 3 slices with sizes of rows of 1 tile, 2 tiles and 3 tiles (i.e. the 3 slices consisting of a row of tiles arranged in the horizontal direction)

Subpicture (2): 2 slices of equal size, the size being 1 tile (i.e. each of the 2 slices consists of a single tile)

Subpictures (3): 4 "tile-fraction" slices, i.e. 4 slices each consisting of a single partial tile Subpictures (4): 2 slices with sizes of columns of 2 tiles (i.e. each of the 2 slices consists of a column of 2 tiles arranged in the vertical direction)

Subpictures (5): 1 slice of a row of 3 tiles

Subpictures (6): 2 slices having the size of a row of 1 tile and a row of 2 tiles For Subpicture (3), the number of slices in the subpicture is equal to 4 and the subpicture contains only two tiles. The width of the slices is inferred to be equal to the subpicture width and the height of the slices are specified in CTU units.

For Subpictures (1), (2), (4), and (5), the number of slices is lower than the tiles in the subpictures and thus the width and height are specified in tiles unit wherever necessary, i.e. where they cannot be inferred/derived/determined from other information.

For subpicture (1), the width and height of the two first slices are coded while the size of the last slice is inferred.

For Subpicture (2), the width and height of the two first slices are inferred since there are 2 slices for 2 tiles in the subpicture.

For subpicture (4), the width and height of the first slices and the size of last slice are inferred from the subpicture size.

For subpicture (5), the width and height are inferred to be equal to the subpicture size since there is a single slice in the subpicture.

For subpicture (5), the height of the slices is inferred to be equal to 1 (since subpicture height in tile units is equal to 1) and the width of the first slice is coded while the width of the last slice is inferred to be equal to the width of the subpicture minus the size of the first slice.

Embodiment 3

In this third embodiment Embodiment 3, in the bitstream, it is specified whether the tile-fraction slices are enabled or disabled. The principle is to included in one of the parameter set NAL units (or a non-VCL NAL units) a syntax element that indicates whether use of a "tile-fraction" slice is allowed or not.

According to a variant, the SPS includes a flag that indicates whether a "tile-fraction" slice is allowed or not and thus the "tile-fraction" signalling can be skipped when this flag indicates a "tile-fraction" slice is not allowed. For example, when the flag is equal to 0, it indicates that a "tile-fraction" slice is not allowed. When the flag is equal to 1, a "tile-fraction" slice is allowed. The NAL unit may include syntax elements to indicate the location of the "tile-fraction" slices. For example, following SPS syntax elements and semantics thereof may be used to do this.
SPS syntax: for enabling/disabling tile-fraction slices

|  | Descriptor |
| --- | --- |
| seq_parameter_set_rbsp( ) { |  |
|   sps_decoding_parameter_set_id | u(4) |
|   [...] |  |
|   subpics_present_flag | u(1) |
|   [...] |  |
|   sps_tile_fraction_slices_enabled_flag | u(1) |
|   [...] |  |
| } |  |

SPS Semantics

The sps_tile_fraction_slices_enabled_flag specifies whether "tile-fraction" slices are enabled in the coded video sequence. sps_tile_fraction_slices_enabled_flag equal to 0 indicates that the slices shall contain an integer number of tiles. sps_tile_fraction_slices_enabled_flag equal 1 indicates that the slice may contain an integer number of tiles or an integer number of CTU rows from one tile.

In a further variant, sps_tile_fraction_slices_enabled_flag is specified at PPS level to provide more granularity for adaptive apply/define the presence of "tile-fraction" slices. In yet another further variant, the flag may be located in the Picture Header NAL Unit to allow/enable adapting of the presence of "tile-fraction" slices on a picture basis. The flag may be present in multiple NAL units with different values to allow overriding the configuration defined in the Parameter Set of a higher level. For example, the value of the flag in the picture header overrides the value in the PPS, which overrides the value in the SPS.

In an alternative variant, the value of sps_tile_fraction_slices_enabled_flag may be constrained or inferred from other syntax elements. For instance, sps_tile_fraction_slices_enabled_flag is inferred to be equal to 0, when the subpicture is not used in the video sequence (i.e. subpics_present_flag equal to 0).

Variants of Embodiment 1 and Embodiment 2 may take into account the value of sps_tile_fraction_slices_enabled_flag to infer the presence or not of the tile-fraction slices signalling in a similar manner. For instance, the PPS presented above may be modified as follows:

|  | Descriptor |
| --- | --- |
| pic_parameter_set_rbsp( ) { |  |
|   pps_pic_parameter_set_id | ue(v) |
|   [...] |  |
|   pps_num_subpics_minus1 | ue(v) |
|   [...] |  |
|   no_pic_partition_flag | u(1) |
|   if( !no_pic_partition_flag ) { |  |

-continued

|  | Descriptor |
| --- | --- |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) |  |
|       tile_column_width_minus1[ i ] | ue(v) |
|     for( i = 0; i <= num_exp_tile_rows_minus1; i++ ) |  |
|       tile_row_height_minus1[ i ] | ue(v) |
|     rect_slice_flag | u(1) |
|     if( rect_slice_flag ) { |  |
|       single_slice_per_subpic_flag | u(1) |
|       if(!single_slice_per_subpic_flag ) { |  |
|         tile_idx_delta_present_flag | u(1) |
|         for( i = 0; i < pps_num_subpic_minus1; i++ ) { |  |
|           num_slices_in_subpic_minus1[ i ] | ue(v) |
|           for( j = 0; j < num_slices_in_subpic_minus1; j++ ) { |  |
|       if(!sps_tile_fraction_slices_enabled_flag \|\| !sliceInCtuFlag[ i ]) { |  |
|         slice_width_in_tiles_minus1[ i ][ j ] | ue(v) |
|         slice_height_in_tiles_minus1[ i ][ j ] | ue(v) |
|         if( tile_idx_delta_present_flag && i < num_slices_in_subpic_minus1[ i ] ) |  |
|           tile_idx_delta[ i ] | se(v) |
|       } else { |  |
|         slice_height_in_ctu_minus1[ i ][ j ] | ue(v) |
|       } |  |
|       } |  |
|       } |  |
|     } |  |
|   } |  |
|   loop_filter_across_tiles_enabled_flag | u(1) |
|   loop_filter_across_slices_enabled_flag | u(1) |
| } |  |

The signalling of the slice height is inferred in tile units when the sps_tile_fraction_slices_enabled_flag equals to 0.

Embodiment 4

In VVC7, the tile-fraction slices are enabled only for rectangular slice mode. Embodiment 4 described below has an advantage in that it enables use of tile-fraction slices in raster-scan slice mode as well. This provides the possibility of being able to adjust more precisely the length in bits of the coded slices since the slice boundaries are not constrained to align to tile boundaries as in VVC7.

The principle comprises defining (or providing the related information for) the slice partitioning in two places. The Parameter Sets define the slices in tile units. The tile-fraction slices are signalled in the slice header. In a variant, sps_tile_fraction_slices_enabled_flag is predetermined to be equal to 1 and the "tile-fraction" signalling in the slice header is always present.

To achieve this, in practice, the semantics of the slices are modified from those of VVC7 and foregoing embodiments/variants/further variants: a slice is a set of one or more slice segment(s) which collectively represent a tile of a picture or an integer number of complete tiles. A slice segment represent an integer number of complete tiles or an integer number of consecutive complete CTU rows (i.e. "tile-fraction") within a tile of a picture that are exclusively contained in a single NAL unit, i.e. one or more tile(s) or a "tile-fraction". A "tile-fraction" slice is a set of contiguous CTU rows of one tile. It is allowed that a slice segment contains all the CTU rows of a tile. In such a case the slice segment contains a single slice segment.

According to a variant, the PPS syntax of any previous embodiments is modified to include the tile fraction specific signalling. An example of such a PPS syntax modification is shown below.

PPS Syntax

The PPS syntax of any previous embodiments is modified to remove the tile fraction specific signalling. For instance, the PPS syntax is the following:

| | Descriptor |
|---|---|
| pic_parameter_set_rbsp( ) { | |
|   pps_pic_parameter_set_id | ue(v) |
|   [...] | |
|   pps_num_subpics_minus1 | ue(v) |
|   [...] | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     rect_slice_flag | u(1) |
|     if( rect_slice_flag ) { | |
|       single_slice_per_subpic_flag | u(1) |
|       if(!single_slice_per_subpic_flag ) { | |
|         tile_idx_delta_present_flag | u(1) |
|         for( i = 0; i < pps_num_subpic_minus1; i++ ) { | |
|           num_slices_in_subpic_minus1[ i ] | ue(v) |
|           for( j = 0; j < num_slices_in_subpic_minus1; j++ ) { | |
|             slice_width_minus1[ i ][ j ] | ue(v) |
|             slice_height_minus1[ i ][ j ] | ue(v) |
|             if( tile_idx_delta_present_flag && i < num_slices_in_subpic_minus1[ i ] ) | |
|               tile_idx_delta[ i ][ j ] | se(v) |
|           } | |
|         } | |
|       } | |
|     } | |
|     loop_filter_across_tiles_enabled_flag | u(1) |
|     loop_filter_across_slices_enabled_flag | u(1) |
| } | |

With the same semantics for the syntax elements.

Slice Segment Syntax

| | Descriptor |
|---|---|
| slice_segment_layer_rbsp( ) { | |
|   slice_segment_header( ) | |
|   slice_segment_data( ) | |
|   rbsp_slice_trailing_bits( ) | |
| } | |

The slice segment NAL unit consists of a slice segment header and slice segment data, which is similar to the VVC7 NAL unit structure for a slice. The slice header from previous embodiments becomes a slice segment header with the same syntax elements as in the slice header but as the slice segment header it includes additional syntax elements for locating/identifying the slice segment in the slice (e.g. described/defined in the PPS).

| | Descriptor |
|---|---|
| slice_segment_header( ) { | |
|   slice_pic_order_cnt_lsb | u(v) |
|   if( subpics_present_flag ) | |
|     slice_subpic_id | u(v) |
|   if( rect_slice_flag || NumTilesInPic > 1 ) | |
|     slice_address | u(v) |
|   if( sps_tile_fraction_slices_enabled_flag ) | |
|     slice_ctu_row_offset | u(v) |
|   if( !rect_slice_flag && NumTilesInPic > 1 ) | |
|     num_tiles_in_slice_minus1 | ue(v) |
|   slice_type | ue(v) |
|   [...] | |

The slice segment header includes signalling to specify at which CTU row the slice segment starts in the slice. slice_ctu_row_offset specifies the CTU line offset of the first CTU in the slice.

When rect_slice_flag equals 0 (i.e. the slice mode is in the raster-scan slice mode), the CTU line offset is relative to the first line of the tile with index equal to slice_address. When rect_slice_flag equals 1 (i.e. in rectangular slice mode) the CTU line offset is relative to the first CTU of the slice with index equal to slice_address in the subpicture identified with slice_subpic_id. The CTU line offset is encoded using variable or fixed length encoding. For fixed length, the number of CTU rows in the slice is determined from the PPS and the length in bits of the syntax element is equal to $\log_2$ of the number of CTU rows minus 1.

There are two ways for indicating the end of the slice segment.

In the first way, the slice segment indicates the number of CTU rows (minus 1) in the slice segment. The number of CTU rows is encoded using variable length encoding or fixed length encoding. For fixed length encoding, the number of CTU rows in slice is determined from the PPS. The length in bits of the syntax element is equal to $\log_2$ of the difference of the number of CTU rows in slice minus the CTU row offset minus 1.

The syntax of the slice header is, for example, the following:

| | Descriptor |
|---|---|
| slice_segment_header( ) { | |
|   slice_pic_order_cnt_lsb | u(v) |
|   if( subpics_present_flag ) | |
|     slice_subpic_id | u(v) |
|   if( rect_slice_flag || NumTilesInPic > 1 ) | |
|     slice_address | u(v) |
|   if( sps_tile_fraction_slices_enabled_flag) | |
|     ctu_row_offset | u(v) |
|   [...] | |
|   if(sps_tile_fraction_slices_enabled_flag || !rect_slice_flag && NumTilesInPic > 1 ) | |
|     num_tiles_in_slice_segment_minus1 | ue(v) |
|   if(sps_tile_fraction_slices_enabled_flag && num_tiles_in_slice_segment_minus1 == 0) | |
|     num_ctu_rows_in_slice_minus1 | u(v) |
|   slice_type | ue(v) |
|   [...] | | num_ctu_rows_in_slice_minus1 plus 1 specifies the number of CTU rows in the slice segment NAL unit. The range of num_ctu_rows_in_slice_minus1 is 0 to the number of CTU rows in the tile contained in the slice minus 2.

When sps_tile_fraction_slices_enabled_flag equals 1 and num_tiles_in_slice_segment_minus1 equal 0, the variable NumCtuInCurrSlice that specifies the number of CTUs in current slice is equal to the number of CTU rows multiplied by the width of the tile present in the slice in CTU units.

In the second way, the slice segment data includes signalling to specify at the end of each CTU rows whether the slice segment ends. An advantage of this second way is that an encoder does not have to determine in advance the number of CTUs in a given slice segment. This reduces the latency of the encoder, which can output the slice header in real time, while for the first way it has to buffer the slice header to indicate the number of CTU rows in the slice segment at the end of the encoding of the slice segment.

Embodiment 5

Embodiment 5 is a modification to the signalling of the subpicture layout, which can lead to an improvement in certain situations. Indeed, increasing the number of subpictures or slices or tiles in a video sequence limits/restricts the effectiveness/efficiency of the temporal and intra prediction mechanisms. As a result, the compression efficiency of the video sequence can be reduced. For this reason, there is a high probability that the subpicture layout can be predetermined/determined/predicted/estimated as a function of the application requirements (e.g. the sizes of the ROIs). The encoding process then generates a tile partitioning that would best match the subpicture layout. In the best case scenario, each subpicture contains exactly one tile. To limit the impact on the compression efficiency, the encoder tries to minimize the number of slice per subpicture by using a single slice per subpicture. As a result, the best option for an encoder is to define one slice and one tile per subpicture.

In such cases, the subpicture layout and slice layout are the same. This embodiment adds a flag in the SPS to indicate such a particular case/scenario/situation. When this flag equals to 1, the subpicture layout is absent and can be inferred/derived/determined as being the same as the slice partition. Otherwise, when the flag is equal to 0 the subpicture layout is explicitly signalled in the bitstream in accordance with what was described above in relation to previous embodiments/variants/further variants.

According to a variant, the SPS includes the sps_single_slice_per_subpicture flag for this purpose:

|  | Descriptor |
| --- | --- |
| seq_parameter_set_rbsp( ) { |  |
| [...] |  |
| subpics_present_flag | u(1) |
| if( subpics_present_flag ) { |  |
|   sps_num_subpics_minus1 | u(8) |
|   sps_single_slice_per_subpicture | u(1) |
|   for( i = 0; i <= sps_num_subpics_minus1; i++ ) { |  |
|     if (!sps_single_slice_per_subpicture) { |  |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|     } |  |
|     subpic_treated_as_pic_flag[ i ] | u(1) |
|     loop_filter_across_subpic_enabled_flag[ i ] | u(1) |
|   } |  |
| } |  |
| [...] |  | sps_single_slice_per_subpicture equal to 1 indicates that each subpicture includes a single slice and the absence of subpic_ctu_top_left_x[i], subpic_ctu_top_left_y[i], subpic_width_minus1[i] and subpic_height_minus1[i] for i in range 0 to sps_num_subpics_minus1, inclusive. sps_single_slice_per_subpicture equal to 0 indicates that subpictures may or may not include a single slice and the presence of subpic_ctu_top_left_x[i], subpic_ctu_top_left_y[i], subpic_width_minus1[i] and subpic_height_minus1[i] for i in range 0 to sps_num_subpics_minus1, inclusive.

According to yet another variant, the PPS syntax includes the following syntax element to indicate that the subpicture layout can be inferred from the slice layout:

|  | Descriptor |
| --- | --- |
| pic_parameter_set_rbsp( ) { |  |
|   pps_pic_parameter_set_id | ue(v) |
|   [...] |  |
|   pps_num_subpics_minus1 | ue(v) |
|   [...] |  |
|   no_pic_partition_flag | u(1) |
|   if( !no_pic_partition_flag ) { |  |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) |  |
|       tile_column_ctu_top_minus1[ i ] | ue(v) |
|     for( i = 0; i <= num_exp_tile_rows_minus1; i++ ) |  |
|       tile_row_height_minus1[ i ] | ue(v) |
|     rect_slice_flag | u(1) |
|     if( rect_slice_flag ) { |  |
|       pps_single_slice_per_subpic_flag | u(1) |
|       if(!pps_single_slice_per_subpic_flag ) { |  |
|         tile_idx_delta_present_flag | u(1) |
|         for( i = 0; i <= pps_num_subpic_minus1; i++ ) { |  |
|           num_slices_in_subpic_minus1 | ue(v) |
|           for( j = 0; j < num_slices_in_subpic_minus1; j++ ) { |  |
|             slice_width_in_tiles_minus1[ i ][ j ] | ue(v) |
|             slice_height_in_tiles_minus1[ i ][ j ] | ue(v) |
|             if( tile_idx_delta_present_flag && j < num_slices_in_subpic_minus1 ) |  |
|               tile_idx_delta[ i ] | se(v) |
|           } |  |
|         } |  |
|       } |  |
|     } |  |
|     loop_filter_across_tiles_enabled_flag | u(1) |
|     loop_filter_across_slices_enabled_flag | u(1) |
|   } |  |

If either the pps_single_slice_per_subpic_flag or the sps_single_slice_per_subpic_flag is equal to 1, there is a single slice per subpicture. When sps_single_slice_per_subpic_flag is equal to 1, the slice layout is absent from the SPS and pps_single_slice_per_subpic_flag must be equal to 0. The PPS then specifies the slice partition. The i-th subpicture has a size and a location corresponding to the i-th slice (i.e. the i-th subpicture and the i-th slice have the same size and location).

When sps_single_slice_per_subpic_flag is equal to 0, the slice layout is present in the SPS and pps_single_slice_per_subpic_flag may be equal to 1 or 0. When sps_single_slice_per_subpic_flag is equal to 1, the SPS then specifies the subpicture partition. The i-th slice has a size and a location corresponding to the i-th subpicture. (i.e. the i-th slice and the i-th subpicture have the same size and location)

To maintain the same subpicture layout for a coded video sequence, an encoder may constrain all the PPS that refers to the SPS with sps_single_slice_per_subpic_flag equal to 1 to describe/define/impose the same slice partitioning.

In a variant, another flag (pps_single_slice_per_tile) is provided to indicate that there is a single slice per tile in the PPS. When this flag is equal to 1, the slice partitioning is inferred to be equal to (i.e. the same as) the tile partitioning. In such a case, when sps_single_slice_per_subpic_flag equals to 1, the subpicture and slice partitioning are inferred to be the same as the tile partitioning.

Implementation of Embodiments of the Invention

One or more of the foregoing embodiments/variants may be implemented in the form of an encoder or a decoder, which performs the method steps of the one or more foregoing embodiments/variants. Following embodiments illustrate such implementations.

Figures 9A, 9B:
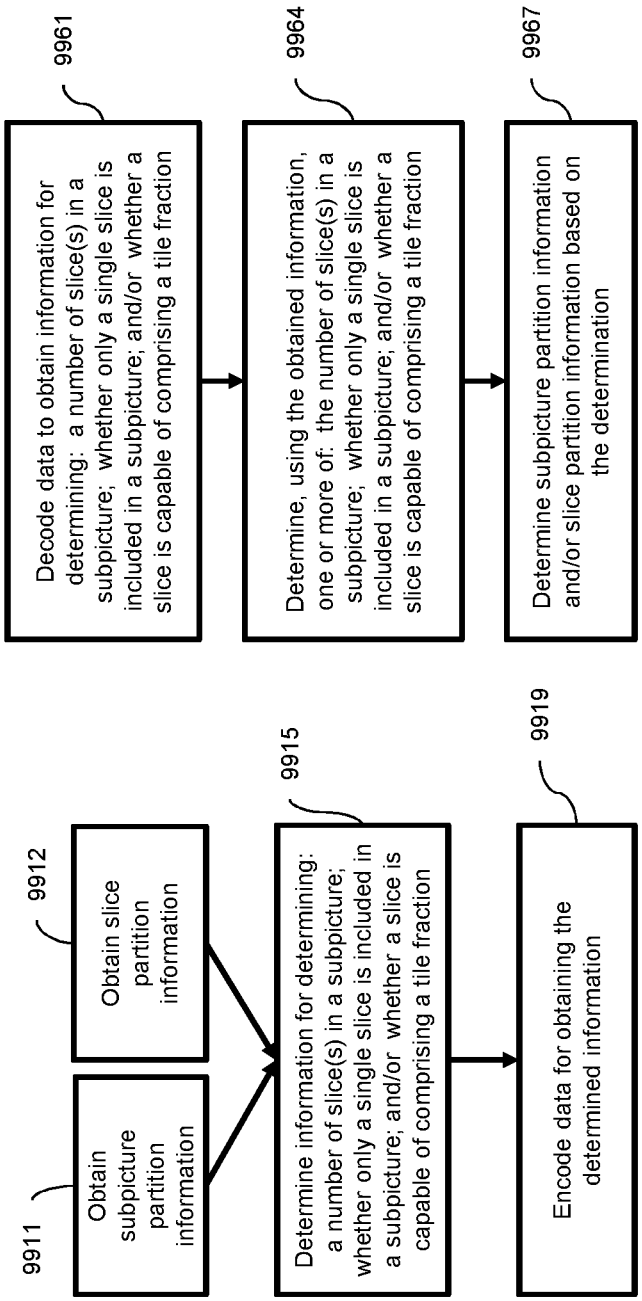
FIG. 9a is a flow chart illustrating steps of an encoding method according to embodiments of the invention.
FIG. 9b is a flow chart illustrating steps of a decoding method according to embodiments of the invention.

FIG. 9a is a flow chart illustrating steps of an encoding method according to embodiments/variants of the invention and FIG. 9b is a flow chart illustrating steps of a decoding method according to embodiments/variants of the invention.

According to the encoding method of FIG. 9a, subpicture partition information is obtained at 9911 and slice partition information is obtained at 9912. At 9915, this obtained information is used to determine information for determining one or more of: a number of slice(s) in a subpicture; whether only a single slice is included in a subpicture; and/or whether a slice is capable of comprising a tile fraction. Data for obtaining this determined information is then encoded at 9919, for example by providing the data in a bitstream.

According to the decoding method of FIG. 9b, at 9961 data is decoded (for example, from a bitstream) to obtain information for determining: a number of slice(s) in a subpicture; whether only a single slice is included in a subpicture; and/or whether a slice is capable of comprising a tile fraction. At 9964, this obtained information is used to determine one or more of: the number of slice(s) in a subpicture; whether only a single slice is included in a subpicture; and/or whether a slice is capable of comprising a tile fraction. Then at 9967, based on this determination and outcome thereof, subpicture partition information and/or slice partition information are determined.

Figure 10:
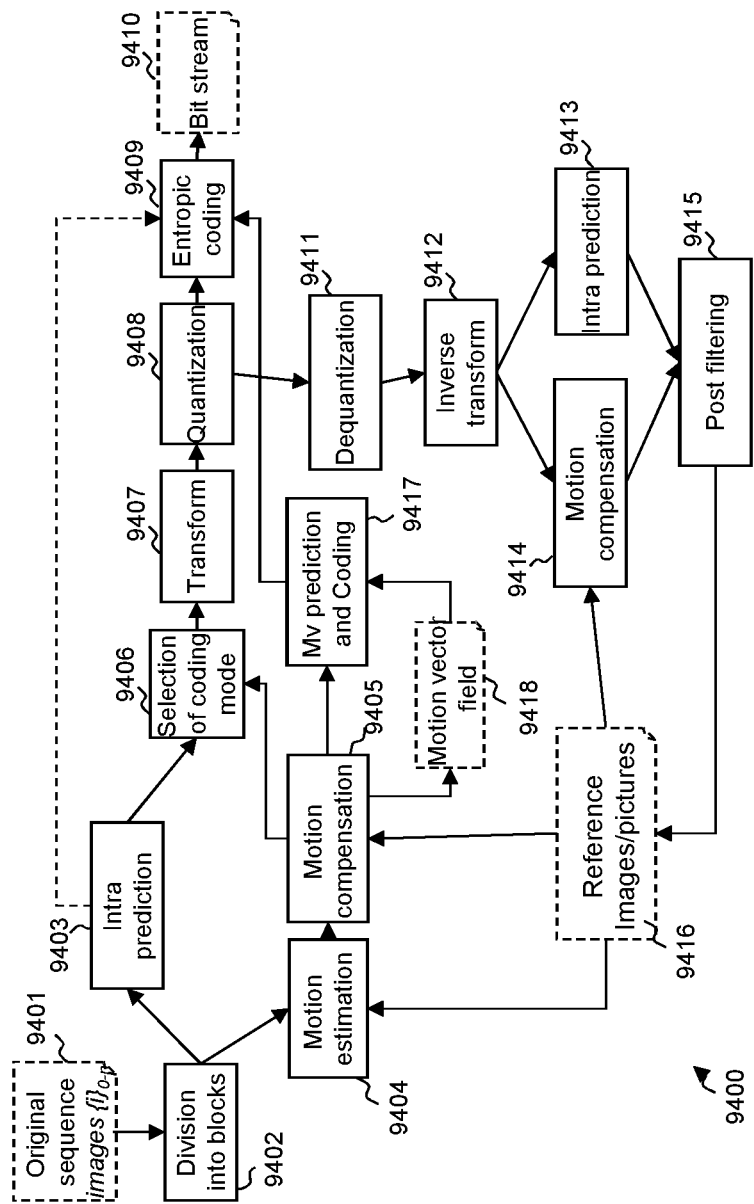
FIG. 10 is a block diagram illustrating steps of an encoding method according to embodiments of the invention.
Figure 11:
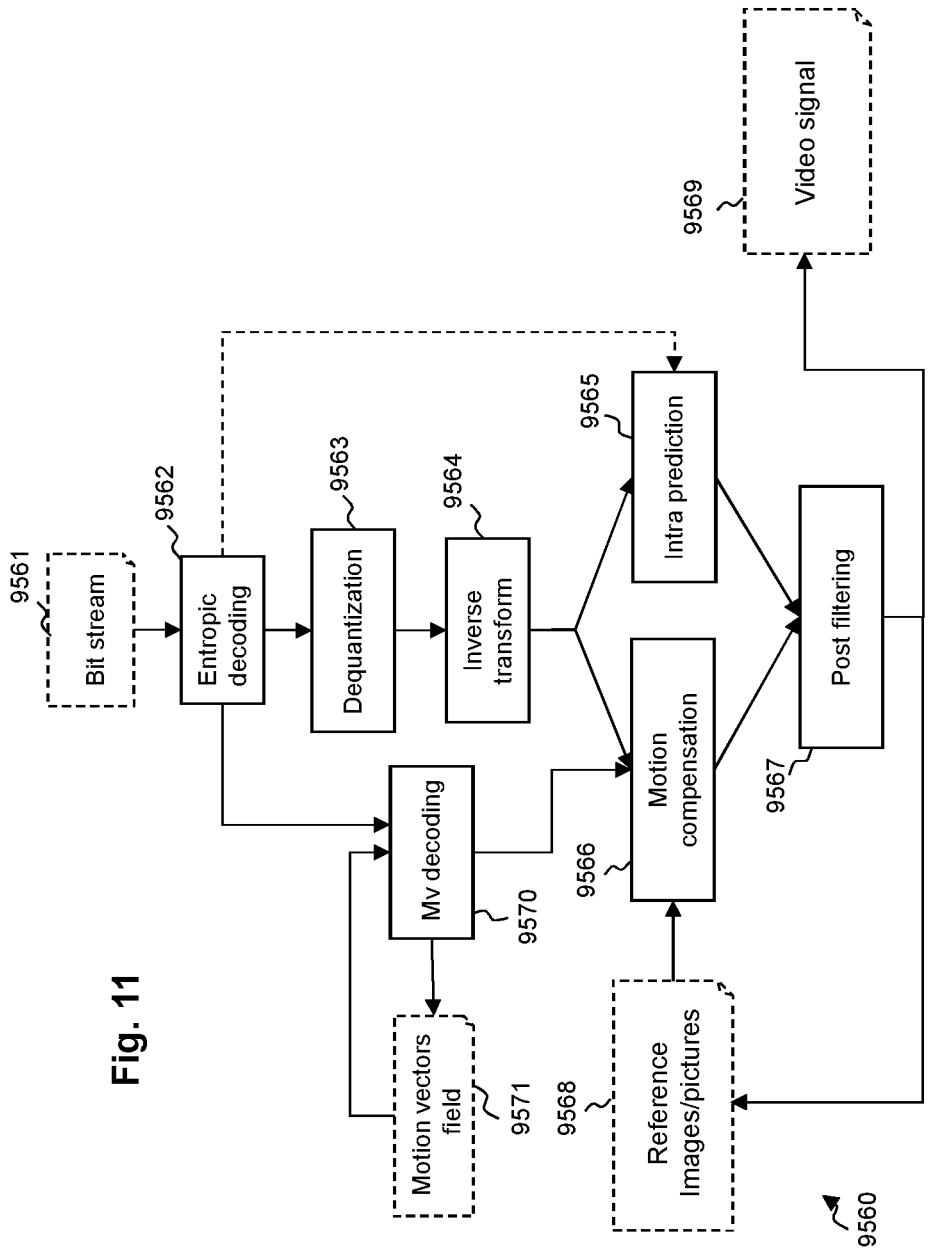
FIG. 11 is a block diagram illustrating steps of a decoding method according to embodiments of the invention.

It is understood that any of the foregoing embodiments/variants may be used by an encoder in FIG. 10 (for example, when performing division into blocks 9402, entropic coding 9409 and/or bitstream generation 9410) or a decoder in FIG. 11 (for example, when performing bitstream processing 9561, entropic decoding 9562 and/or video signal generation 9569).

FIG. 10 illustrates a block diagram of an encoder according to an embodiment of the invention. The encoder is represented by connected modules, each module being adapted to implement, for example in the form of programming instructions to be executed by a Central Processing Unit (CPU) of a device, at least one corresponding step of a method implementing at least one embodiment of encoding an image of a sequence of images according to one or more embodiments/variants of the invention.

An original sequence of digital images i0 to in 9401 is received as an input by the encoder 9400. Each digital image is represented by a set of samples, sometimes also referred to as pixels (hereinafter, they are referred to as pixels). A bitstream 9410 is output by the encoder 9400 after implementation of the encoding process. The bitstream 9410 comprises data for a plurality of encoding units or image portions such as slices, each slice comprising a slice header for transmitting encoding values of encoding parameters used to encode the slice and a slice body, comprising encoded video data. The input digital images i0 to in 9401 are divided into blocks of pixels by a module 9402. The blocks correspond to image portions (herein after an image portion represents any type of a part of an image such as a tile, a slice, a slice segment or a subpicture) and may be of variable sizes (e.g. 4×4, 8×8, 16×16, 32×32, 64×64, 128×128 pixels and several rectangular block sizes can be also considered). A coding mode is selected for each input block. Two families of coding modes are provided: coding modes based on spatial prediction coding (Intra prediction), and coding modes based on temporal prediction (e.g. Inter coding, MERGE, SKIP). The possible coding modes are tested. Module 9403 implements an Intra prediction process, in which the given block to be encoded is predicted by a predictor computed from pixels of the neighborhood of said block to be encoded. An indication of the selected Intra predictor and the difference between the given block and its predictor is encoded to provide a residual if the Intra coding is selected. A temporal prediction is implemented by a motion estimation module 9404 and a motion compensation module 9405. Firstly a reference image from among a set of reference images 9416 is selected, and a portion of the reference image, also called reference area or image portion, which is the closest area (closest in terms of pixel value similarity) to the given block to be encoded, is selected by the motion estimation module 9404. The motion compensation module 9405 then predicts the block to be encoded using the selected area. The difference between the selected reference area and the given block, also called a residual block/data, is computed by the motion compensation module 9405. The selected reference area is indicated using a motion information (e.g. a motion vector). Thus, in both cases (spatial and temporal prediction), a residual is computed by subtracting the predictor from the original block when it is not in the SKIP mode. In the INTRA prediction implemented by the module 9403, a prediction direction is encoded. In the Inter prediction implemented by the modules 9404, 9405, 9416, 9418, 9417, at least one motion vector or information (data) for identifying such motion vector is encoded for the temporal prediction. Information relevant to the motion vector and the residual block is encoded if the Inter prediction is selected. To further reduce the bitrate, assuming that motion is homogeneous, the motion vector is encoded by difference with respect to a motion vector predictor. Motion vector predictors from a set of motion information predictor candidates is obtained from the motion vectors field 9418 by a motion vector prediction and coding module 9417. The encoder 9400 further comprises a selection module 9406 for selecting a coding mode by applying an encoding cost criterion, such as a rate-distortion criterion. In order to further reduce redundancies, a transform (such as DCT) is applied by a transform module 9407 to the residual block, and the transformed data obtained is then quantized by a quantization module 9408 and entropy encoded by an entropy encoding module 9409. Finally, the encoded residual block of the current block being encoded is inserted into the bitstream 9410 when it is not in the SKIP mode and the selected coding mode requires encoding of the residual block.

The encoder 9400 also performs decoding of the encoded image in order to produce a reference image (e.g. those in the Reference images/pictures 9416) for the motion estimation of the subsequent images. This enables the encoder and a decoder receiving the bitstream to have the same reference frames (e.g. reconstructed images or reconstructed image portions are used). An inverse quantization ("dequantization") module 9411 performs an inverse quantization ("dequantization") of the quantized data, which is then followed by an inverse transform performed by an inverse transform module 9412. An intra prediction module 9413 uses prediction information to determine which predictor to use for a given block and a motion compensation module 9414 actually adds the residual obtained by the module 9412 to the reference area obtained from the set of reference images 9416. Post filtering is then applied by a module 9415 to filter the reconstructed frame (image or image portions) of pixels to obtain another reference image for the set of reference images 9416.

FIG. 11 illustrates a block diagram of a decoder 9560 which may be used to receive data from an encoder according an embodiment of the invention. The decoder is represented by connected modules, each module being adapted to implement, for example in the form of programming instructions to be executed by a CPU of device, a corresponding step of a method implemented by the decoder 9560.

The decoder 9560 receives a bitstream 9561 comprising encoded units (e.g. data corresponding to an image portion, a block or a coding unit), each one being composed of a header containing information on encoding parameters and a body containing the encoded video data. As explained with respect to FIG. 10, the encoded video data is entropy encoded, and the motion information (e.g. motion vector predictors' indexes) are encoded, for a given image portion (e.g. a block or a CU), on a predetermined number of bits. The received encoded video data is entropy decoded by a module 9562. The residual data is then dequantized by module 9563 and then an inverse transform is applied by a module 9564 to obtain pixel values.

The mode data indicating the coding mode are also entropy decoded and based on the mode, an INTRA type decoding or an INTER type decoding is performed on the encoded blocks (units/sets/groups) of image data. In the case of INTRA mode, an INTRA predictor is determined by an intra prediction module 9565 based on the intra prediction mode specified in the bitstream (e.g. the intra prediction mode is determinable using data provided in the bitstream). If the mode is INTER mode, the motion prediction information is extracted/obtained from the bitstream so as to find (identify) the reference area used by the encoder. The motion prediction information comprises the reference frame index and the motion vector residual, for example. The motion vector predictor is added to the motion vector residual by a motion vector decoding module 9570 in order to obtain the motion vector. The motion vector decoding module 9570 applies motion vector decoding for each image portion (e.g. current block or CU) encoded by motion prediction. Once an index of the motion vector predictor for the current block has been obtained, the actual value of the motion vector associated with the image portion (e.g. current block or CU) can be decoded and used to apply motion compensation by a module 9566. The reference image portion indicated by the decoded motion vector is extracted/obtained from a set of Reference images 9568 so that the module 9566 can perform the motion compensation. Motion vector field data 9571 is updated with the decoded motion vector in order to be used for the prediction of subsequently decoded motion vectors. Finally, a decoded block is obtained. Where appropriate, post filtering is applied by a post filtering module 9567. A decoded video signal 9569 is finally obtained and provided by the decoder 9560.

Figure 12:
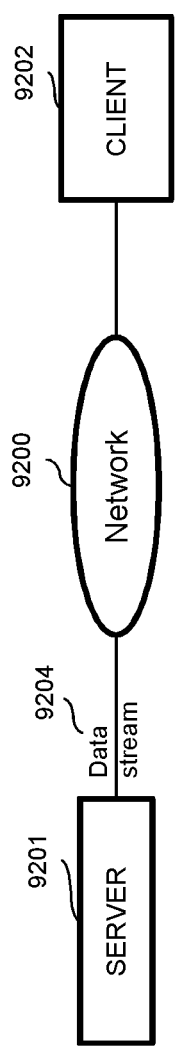
FIG. 12 is a block diagram schematically illustrating a data communication system in which one or more embodiments of the invention may be implemented.

FIG. 12 illustrates a data communication system in which one or more embodiments of the invention may be implemented. The data communication system comprises a transmission device, in this case a server 9201, which is operable to transmit data packets of a data stream 9204 to a receiving device, in this case a client terminal 9202, via a data communication network 9200. The data communication network 9200 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 9201 sends the same data content to multiple clients. The data stream 9204 provided by the server 9201 may be composed of multimedia data representing video and audio data. Audio and video data streams may, in some embodiments of the invention, be captured by the server 9201 using a microphone and a camera respectively. In some embodiments data streams may be stored on the server 9201 or received by the server 9201 from another data provider, or generated at the server 9201. The server 9201 is provided with an encoder for encoding video and audio streams in particular to provide a compressed bitstream for transmission that is a more compact representation of the data presented as input to the encoder. In order to obtain a better ratio of the quality of transmitted data to quantity of transmitted data, the compression of the video data may be for example in accordance with the High Efficiency Video Coding (HEVC) format or H.264/Advanced Video Coding (AVC) format or Versatile Video Coding (VVC) format. The client 9202 receives the transmitted bitstream and decodes the reconstructed bitstream to reproduce video images on a display device and the audio data by a loud speaker. Although a streaming scenario is considered in this embodiment, it will be appreciated that in some embodiments of the invention the data communication between an encoder and a decoder may be performed using for example a media storage device such as an optical disc. In one or more embodiments of the invention a video image may be transmitted with data representative of compensation offsets for application to reconstructed pixels of the image to provide filtered pixels in a final image.

Figure 13:
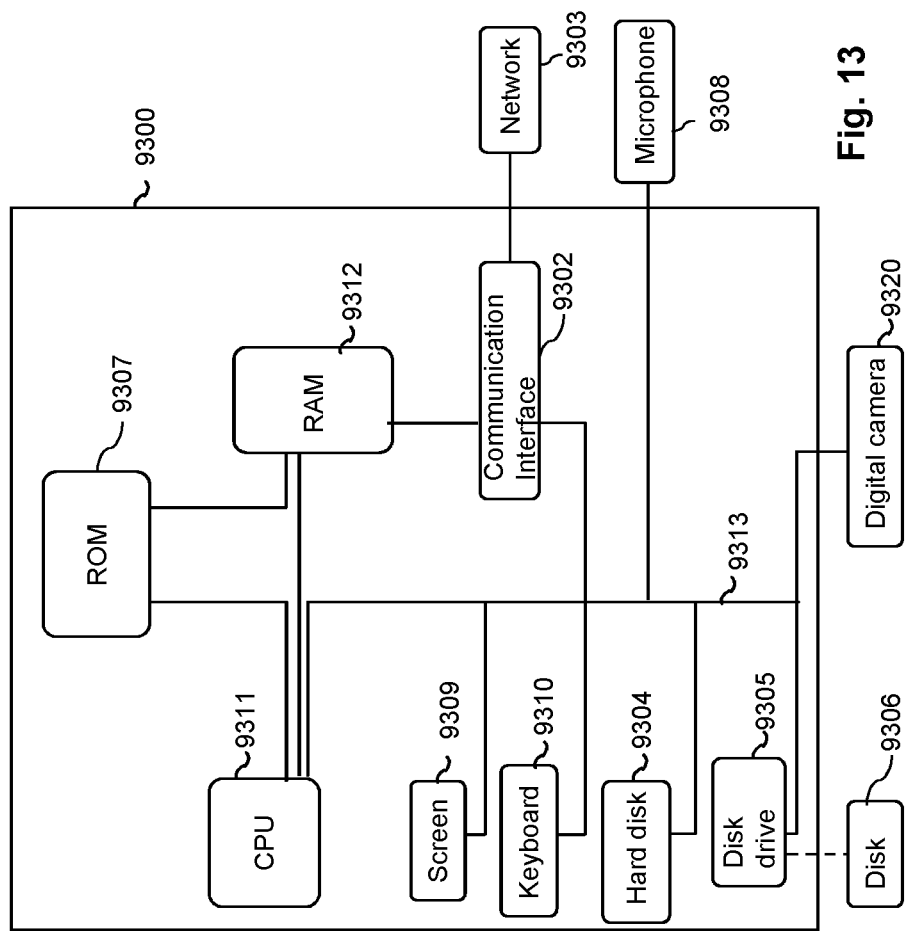
FIG. 13 is a block diagram illustrating components of a processing device in which one or more embodiments of the invention may be implemented.

FIG. 13 schematically illustrates a processing device 9300 configured to implement at least one embodiment/variant of the invention. The processing device 9300 may be a device such as a micro-computer, a workstation, a user terminal or a light portable device. The device/apparatus 9300 comprises a communication bus 9313 connected to: —a central processing unit 9311, such as a microprocessor, denoted CPU; —a read only memory 9307, denoted ROM, for storing computer programs/instructions for operating the device 9300 and/or implementing the invention; —a random access memory 9312, denoted RAM, for storing the executable code of the method of embodiments/variants of the invention as well as the registers adapted to record variables and parameters necessary for implementing the method of encoding a sequence of digital images and/or the method of decoding a bitstream according to embodiments/variants of the invention; and —a communication interface 9302 connected to a communication network 9303 over which digital data to be processed are transmitted or received.

Optionally, the apparatus 9300 may also include following components: —a data storage means 9304 such as a hard disk, for storing computer programs for implementing methods of one or more embodiments/variants of the invention and data used or produced during the implementation of one or more embodiments/variants of the invention; —a disk drive 9305 for a disk 9306 (e.g. a storage medium), the disk drive 9305 being adapted to read data from the disk 9306 or to write data onto said disk 9306; or —a screen 9309 for displaying data and/or serving as a graphical interface with a user, by means of a keyboard 9310, a touchscreen or any other pointing/input means. The apparatus 9300 can be connected to various peripherals, such as for example a digital camera 9320 or a microphone 9308, each being connected to an input/output card (not shown) so as to supply multimedia data to the apparatus 9300. The communication bus 9313 provides communication and interoperability between the various elements included in the apparatus 9300 or connected to it. The representation of the bus is not limiting and in particular the central processing unit 9311 is operable to communicate instructions to any element of the apparatus 9300 directly or by means of another element of the apparatus 9300. The disk 9306 can be replaced by any information medium such as for example a compact disk (CD-ROM), rewritable or not, a ZIP disk or a memory card and, in general terms, by an information storage means that can be read by a microcomputer or by a processor, integrated or not into the apparatus, possibly removable and adapted to store one or more programs whose execution enables the method of encoding a sequence of digital images and/or the method of decoding a bitstream according to the invention to be implemented. The executable code may be stored either in read only memory 9307, on the hard disk 9304 or on a removable digital medium such as for example a disk 9306 as described previously. According to a variant, the executable code of the programs can be received by means of the communication network 9303, via the interface 9302, in order to be stored in one of the storage means of the apparatus 9300 before being executed, for example in the hard disk 9304. The central processing unit 9311 is adapted to control and direct the execution of the instructions or portions of software code of the program or programs according to the invention, instructions that are stored in one of the aforementioned storage means. On powering up, the program or programs that are stored in a non-volatile memory, for example on the hard disk 9304, the disk 9306 or in the read only memory 9307, are transferred into the random access memory 9312, which then contains the executable code of the program or programs, as well as registers for storing the variables and parameters necessary for implementing the invention. In this embodiment, the apparatus is a programmable apparatus which uses software to implement the invention. However, alternatively, the present invention may be implemented in hardware (for example, in the form of an Application Specific Integrated Circuit or ASIC).

Implementation of Embodiments of the Invention

It is also understood that according to other embodiments of the present invention, a decoder according to an aforementioned embodiment/variant is provided in a user terminal such as a computer, a mobile phone (a cellular phone), a tablet or any other type of a device (e.g. a display apparatus) capable of providing/displaying a content to a user. According to yet another embodiment, an encoder according to an aforementioned embodiment/variant is provided in an image capturing apparatus which also comprises a camera, a video camera or a network camera (e.g. a closed-circuit television or video surveillance camera) which captures and provides the content for the encoder to encode. Two such embodiments are provided below with reference to FIGS. 14 and 15.

Figure 14:
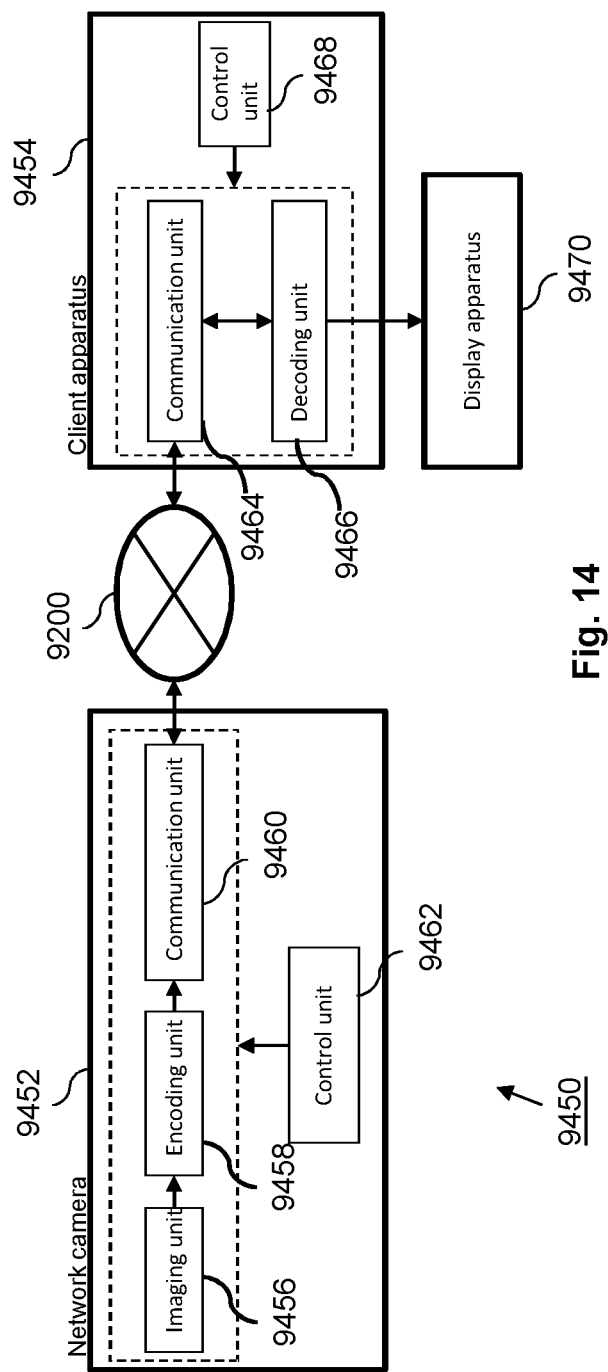
FIG. 14 is a diagram illustrating a network camera system in which one or more embodiments of the invention may be implemented.

FIG. 14 is a diagram illustrating a network camera system 9450 comprising a network camera 9452 and a client apparatus 9454. The network camera 9452 comprises an imaging unit 9456, an encoding unit 9458, a communication unit 9460, and a control unit 9462. The network camera 9452 and the client apparatus 9454 are mutually connected to be able to communicate with each other via the network 9200. The imaging unit 9456 comprises a lens and an image sensor (e.g., a charge coupled device (CCD) or a complementary metal oxide semiconductor (CMOS)), and captures an image of an object and generates image data based on the image. This image can be a still image or a video image. The imaging unit may also comprise zooming means and/or panning means which are adapted to zoom or pan (either optically or digitally) respectfully. The encoding unit 9458 encodes the image data by using said encoding methods explained in one or more of the foregoing embodiments/variants. The encoding unit 9458 uses at least one of encoding methods explained in the foregoing embodiments/variants. For another instance, the encoding unit 9458 can use a combination of encoding methods explained in the foregoing embodiments/variants. The communication unit 9460 of the network camera 9452 transmits the encoded image data encoded by the encoding unit 9458 to the client apparatus 9454. Further, the communication unit 9460 may also receive commands from client apparatus 9454. The commands comprise commands to set parameters for the encoding by the encoding unit 9458. The control unit 9462 controls other units in the network camera 9452 in accordance with the commands received by the communication unit 9460 or user input. The client apparatus 9454 comprises a communication unit 9464, a decoding unit 9466, and a control unit 9468. The communication unit 9464 of the client apparatus 9454 may transmit commands to the network camera 9452. Further, the communication unit 9464 of the client apparatus 9454 receives the encoded image data from the network camera 9452. The decoding unit 9466 decodes the encoded image data by using said decoding methods explained in one or more of the foregoing embodiments/variants. For another instance, the decoding unit 9466 can use a combination of decoding methods explained in the foregoing embodiments/variants. The control unit 9468 of the client apparatus 9454 controls other units in the client apparatus 9454 in accordance with the user operation or commands received by the communication unit 9464. The control unit 9468 of the client apparatus 9454 may also control a display apparatus 9470 so as to display an image decoded by the decoding unit 9466. The control unit 9468 of the client apparatus 9454 may also control the display apparatus 9470 so as to display GUI (Graphical User Interface) to designate values of the parameters for the network camera 9452, for example of the parameters for the encoding by the encoding unit 9458. The control unit 9468 of the client apparatus 9454 may also control other units in the client apparatus 9454 in accordance with user operation input to the GUI displayed by the display apparatus 9470. The control unit 9468 of the client apparatus 9454 may also control the communication unit 9464 of the client apparatus 9454 so as to transmit commands to the network camera 9452 which designate values of the parameters for the network camera 9452, in accordance with the user operation input to the GUI displayed by the display apparatus 9470.

Figure 15:
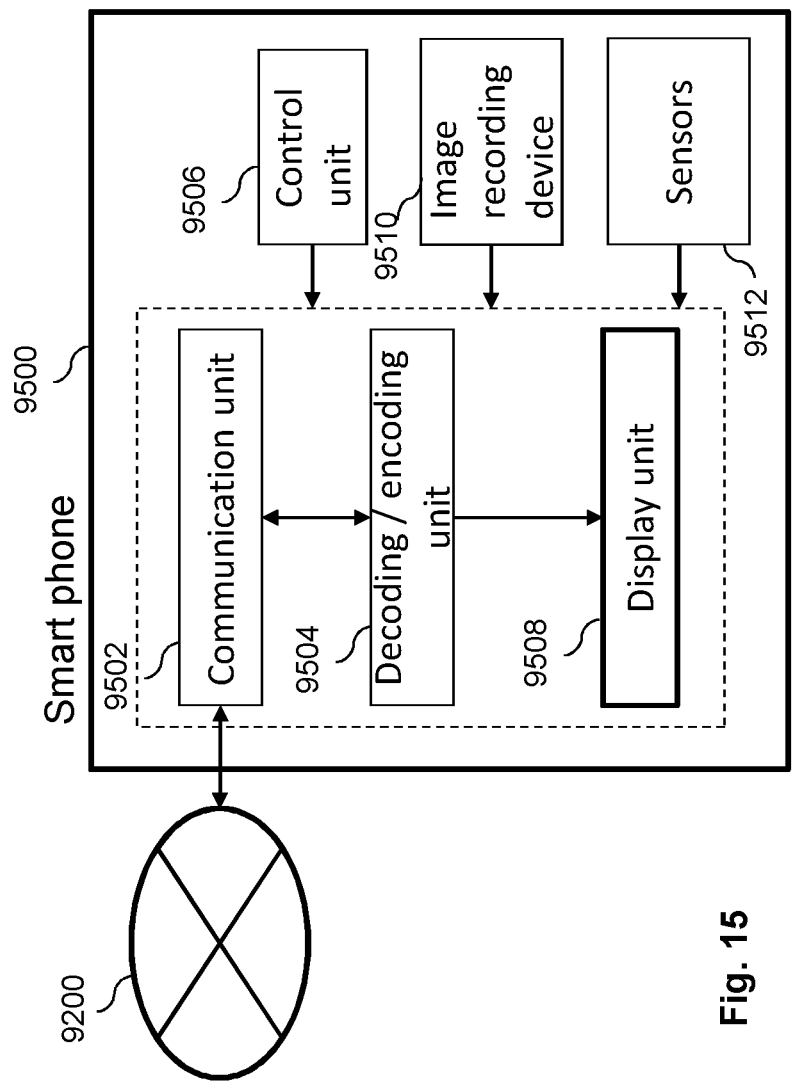
FIG. 15 is a diagram illustrating a smart phone in which one or more embodiments of the invention may be implemented.

FIG. 15 is a diagram illustrating a smart phone 9500. The smart phone 9500 comprises a communication unit 9502, a decoding/encoding unit 9504, a control unit 9506, and a display unit 9508. The communication unit 9502 receives the encoded image data via network 9200. The decoding/encoding unit 9504 decodes the encoded image data received by the communication unit 9502. The decoding/encoding unit 9504 decodes the encoded image data by using said decoding methods explained in one or more of the foregoing embodiments/variants. The decoding/encoding unit 9504 can also use at least one of encoding or decoding methods explained in the foregoing embodiments/variants. For another instance, the decoding/encoding unit 9504 can use a combination of decoding or encoding methods explained in the foregoing embodiments/variants. The control unit 9506 controls other units in the smart phone 9500 in accordance with a user operation or commands received by the communication unit 9502. For example, the control unit 9506 controls a display unit 9508 so as to display an image decoded by the decoding/encoding unit 9504. The smart phone may further comprise an image recording device 9510 (for example a digital camera and an associated circuitry) to record images or videos. Such recorded images or videos may be encoded by the decoding/encoding unit 9504 under instruction of the control unit 9506. The smart phone may further comprise sensors 9512 adapted to sense the orientation of the mobile device. Such sensors could include an accelerometer, gyroscope, compass, global positioning (GPS) unit or similar positional sensors. Such sensors 9512 can determine if the smart phone changes orientation and such information may be used when encoding a video stream.

While the present invention has been described with reference to embodiments and variants thereof, it is to be understood that the invention is not limited to the disclosed embodiments/variants. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, inference, assessment, selection, execution, performing, or consideration described above, for example a selection made during an encoding, processing or partitioning process, may be indicated in or determinable/inferable from data in a bitstream, e.g. a flag or information indicative of the result, so that the indicated or determined/inferred result can be used in the processing instead of actually performing the comparison, determination, assessment, selection, execution, performing, or consideration, e.g. during a decoding or partitioning process. It is understood that when a "table" or a "lookup table" is used, other data types such as an array may also be used to perform the same function, as long as that data type is capable of performing the same function (e.g. representing a relationship/mapping among different elements).

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Reference numerals appearing in the claims are by way of illustration only and shall have no limiting effect on the scope of the claims.

In the preceding embodiments/variants, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate/logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The invention claimed is:

1. A method of decoding image data for one or more images, each image consisting of one or more tiles and being divisible into one or more slices, wherein a slice is capable of including a part of a tile, and the image is divisible into one or more subpictures, and the method comprises:
obtaining information indicating a width of a subpicture and information indicating a height of the subpicture;
determining a parameter associated with one or more slices included in the subpicture using the obtained information indicating the width of the subpicture and the obtained information indicating the height of the subpicture; and
decoding the one or more images using the parameter obtained from the determination.

2. The method according to claim 1 wherein the part of a tile is an integer number of consecutive complete coding tree unit, CTU, rows within a tile.

3. The method according to claim 1, further comprising defining one or more slices using:

4. The method according to claim 1, further comprising defining one or more slices based on whether only a single slice is included in the subpicture.

5. The method according to claim 1, wherein parameter associated with the one or more slices is a number of slices in the subpicture.

6. The method according to claim 1, wherein when a slice comprises one or more parts of a tile, said slice is determined based on a number of rows or columns of Coding Tree Units CTUs to be included therein.

7. The method according to claim 1, further comprising obtaining from, a bitstream, information for determining one or more of:
whether only a single slice is included in the subpicture; and
a number of slices included in the subpicture.

8. The method according to claim 7, wherein the information for determining is obtained from a, Picture Parameter Set, PPS.

9. The method according to claim 7, wherein the information for determining is obtained from a, Sequence Parameter Set, SPS.

10. The method according to claim 1, wherein the subpicture comprises two or more slices, each slice comprising one or more parts of a tile.

11. The method according to claim 10, wherein the one or more parts of a tile are from a same single tile.

12. The method according to claim 1, wherein a slice consists of one or more tiles, said slice forming a rectangular region in the image.

13. The method according to claim 12, further comprising obtaining from the Picture Parameter Set (PPS), information for determining whether only a single slice is included in the subpicture.

14. The method according to claim 12, further comprising obtaining from the Picture Parameter Set, PPS, information for determining a number of slices included in the subpicture.

15. The method according to claim 12, further comprising obtaining from, a bitstream from the Sequence Parameter Set, SPS, information indicating whether a subpicture is used in a video sequence or not.

16. A device for decoding image data for one or more images, each image consisting of one or more tiles and being divisible into one or more slices, wherein a slice is capable of including a part of a tile, and the image is divisible into one or more subpictures, and the device comprises:
an information decoder which obtains information indicating a width of a subpicture and information indicating a height of the subpicture;
a parameter determiner which determines a parameter associated with one or more slices included in the subpicture using the obtained information indicating the width of the subpicture and the obtained information indicating the height of the subpicture; and
an image decoder which decodes the one or more images using the parameter obtained from the determination.

17. A device for encoding image data for one or more images, each image consisting of one or more tiles and being divisible into one or more slices, wherein a slice is capable of including a part of a tile and the image is divisible into one or more subpictures, and the device comprises:
an information encoder which provides, information indicating a width of a subpicture and information indicating a height of the subpicture;
a parameter determiner which determines a parameter of one or more slices included in the subpicture using the information indicating the width of the subpicture and the information indicating the height of the subpicture; and
an image encoder which encodes the one or more images using the parameter obtained from the determination.

18. A non-transitory computer readable medium carrying a computer program comprising program instructions adapted to perform, when executed by one or more processors, a method of decoding image data for one or more images, each image consisting of one or more tiles and being divisible into one or more slices, wherein a slice is capable of including a part of a tile, and the image is divisible into one or more subpictures, and the method comprises:
obtaining information indicating a width of a subpicture and information indicating a height of the subpicture;
determining a parameter associated with one or more slices included in the subpicture using the obtained information indicating the width of the subpicture and the obtained information indicating the height of the subpicture; and
decoding the one or more images using the parameter obtained from the determination.

19. A method of encoding image data for one or more images, each image consisting of one or more tiles and being divisible into one or more slices, wherein a slice is capable of including a part of a tile and the image is divisible into one or more subpictures, and the method comprises:
providing, information indicating a width of a subpicture and information indicating a height of the subpicture;
determining a parameter of one or more slices included in the subpicture using the information indicating the width of the subpicture and the information indicating the height of the subpicture; and
encoding the one or more images using the parameter obtained from the determination.

20. A non-transitory computer readable medium carrying a computer program comprising program instructions adapted to perform, when executed by one or more processors, a method of encoding image data for one or more images, each image consisting of one or more tiles and being divisible into one or more slices, wherein a slice is capable of including a part of a tile and the image is divisible into one or more subpictures, and the method comprises:
providing, information indicating a width of a subpicture and information indicating a height of the subpicture;
determining a parameter of one or more slices included in the subpicture using the provided information indicating the width of the subpicture and the obtained information indicating the height of the subpicture; and
encoding the one or more images using the parameter obtained from the determination.

* * * * *